(12) United States Patent
Mueller et al.

(10) Patent No.: US 7,098,435 B2
(45) Date of Patent: *Aug. 29, 2006

(54) METHOD AND APPARATUS FOR SCANNING THREE-DIMENSIONAL OBJECTS

(75) Inventors: Frederick E. Mueller, 1307 ½Venice Blvd., Venice, CA (US) 90291-5010; John L. Miramonti, Lebanon, OH (US)

(73) Assignee: Frederick E. Mueller, San Francisco, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 10/216,088

(22) Filed: Aug. 9, 2002

(65) Prior Publication Data

US 2003/0066949 A1 Apr. 10, 2003

Related U.S. Application Data

(63) Continuation-in-part of application No. 09/945,133, filed on Aug. 31, 2001, now abandoned, which is a continuation of application No. 09/236,727, filed on Jan. 25, 1999, now Pat. No. 6,288,385, which is a continuation of application No. 08/738,437, filed on Oct. 25, 1996, now Pat. No. 5,864,640.

(51) Int. Cl.
H01L 27/00 (2006.01)

(52) U.S. Cl. .................. 250/208.1; 250/559.4

(58) Field of Classification Search ............ 250/208.1, 250/559.4, 559.46, 223 B; 356/601, 430, 356/434, 237.1, 239.1, 239.7; 382/142, 154, 382/203

See application file for complete search history.

(56) References Cited

U.S. PATENT DOCUMENTS

| | | | |
|---|---|---|---|
| 4,758,730 A | 7/1988 | Bazin et al. | |
| 4,792,696 A | 12/1988 | Kender et al. | |
| 4,912,336 A | 3/1990 | Nayar et al. | |
| 5,511,153 A | 4/1996 | Azarbayejani et al. | |
| 5,559,334 A | 9/1996 | Gupta et al. | |
| 5,611,000 A | 3/1997 | Szeliski et al. | |
| 5,671,157 A | 9/1997 | Saito | |
| 5,733,126 A * | 3/1998 | Andersson et al. | ......... 433/223 |
| 5,818,959 A | 10/1998 | Webb et al. | |
| 5,917,937 A | 6/1999 | Szeliski et al. | |
| 6,009,188 A | 12/1999 | Cohen et al. | |
| 6,009,190 A | 12/1999 | Szeliski et al. | |
| 6,424,422 B1 * | 7/2002 | Kamon et al. | ............... 356/623 |

OTHER PUBLICATIONS

Debevec, Taylor, Malik; Modeling and Rendering Architecture from Photographs: A hybrid geometry and image based approach, Technical Report UCB/ICSD-96-893; Jan. 19, 1996.
Kang, Webb, Zitnick, Kanade; A Multibaseline Stereo System Active Illumination and Real-time Image Acquisition; Believed to be 1994.
Kanade, Kano, Kiumra, Yoshida, Oda; Development of a Video-Rate Stereo Machine; Aug. 5-9, 1995.
Morita, Kanade; A sequential Factorization Method for Recovering Shape and Motion from Image Streams; Nove. 1994.
Poelman, Kanade; A Paraperspective Factorization Method for Shape and Motion Recovery; Dec. 11, 1993.
Katsushi, Ikeuchi, Sato; Determining reflectance properties of an object using range and brightness images; Nov. 1991.
Kang, Webb, Zitnick, Kanade; An Active Multibaseline Stereo System With Real-time Image Acquisition; Sep. 1994.

(Continued)

Primary Examiner—Que T. Le
(74) Attorney, Agent, or Firm—Edward S. Sherman

(57) ABSTRACT

Apparatus and method for creating 3D imagery of an object using calibration means to transfer data to a reference frame and visibility analysis to determine and resolve occlusion.

154 Claims, 15 Drawing Sheets

OTHER PUBLICATIONS

Lighting Technologies Inc.; FAQ: Photopia (Materials/Lamps), website content; Copyright 2003.

Wei-Chao Chen; Light Field Mapping:Efficient Representation of Surface Light Fields: 2002.

Gortler, Grzesczuk, Szeliski, Cohen: The Lumigraph: Aug. 1996.

Richard Szeliski; Image Mosalcing for Tele-Reality Applications; May 1994; Cambridge, Massachusetts.

Kang, Szeliski; 3-D Scene Data Recovery Using Omnidirectional Multibaseline Stereo; Oct. 1995.

Zitnick, Webb; Multi-baseline Stereo Using Surface Extraction; Nov. 24, 1996; Pittsburgh, PA.

Debevec, Taylor, Malik; Modeling and Rendering Architecture from Photographs: A hybrid geometry and images based approach; 1996.

Sato, Ikeuchi: Reflectance Analysis for 3D Computer Graphics Model Generation; Sep. 1996; PA.

Paul Ernest Debevec; Modeling and Rendering Architecture from Photographs; Fall 1996; Berkeley, CA.

Mark J. Carlotto; Shape from Shading, website content; last updated Oct. 15, 1996.

Robert T. Collins; A Space-Sweep Approach to True Multi-Image Matching; date unknown; Amherst, MA.

Andrew C. Beers et al, "Rendering from Compressed Textures", SIGGRAPH 1996, Jul. 1996. pp. 373-378.

Paul S. Heckbert, "Survey of Texture Mapping", Pixar, *Proceedings of Graphics Interface '86*, pp. 207-212, May 1986.

Christensen et al. , "Wavelet Radiancy", University of Washington, 1994.

Certain et al., "Interactive Multiresolution Surface Viewing", pp.: 75-82 Year of Publication: 1996 ISBN:0-89791-746-4.

Greg Ward, "The Materials and Geometry Format" MGF Parser and Examples, MGF Entity C, MGF Example Objects, 1995.

Pharr et al., Geometry Caching for Ray-Tracing Displacement Maps, Proc. 1996 Eurographics Workshop on Rendering.

\* cited by examiner

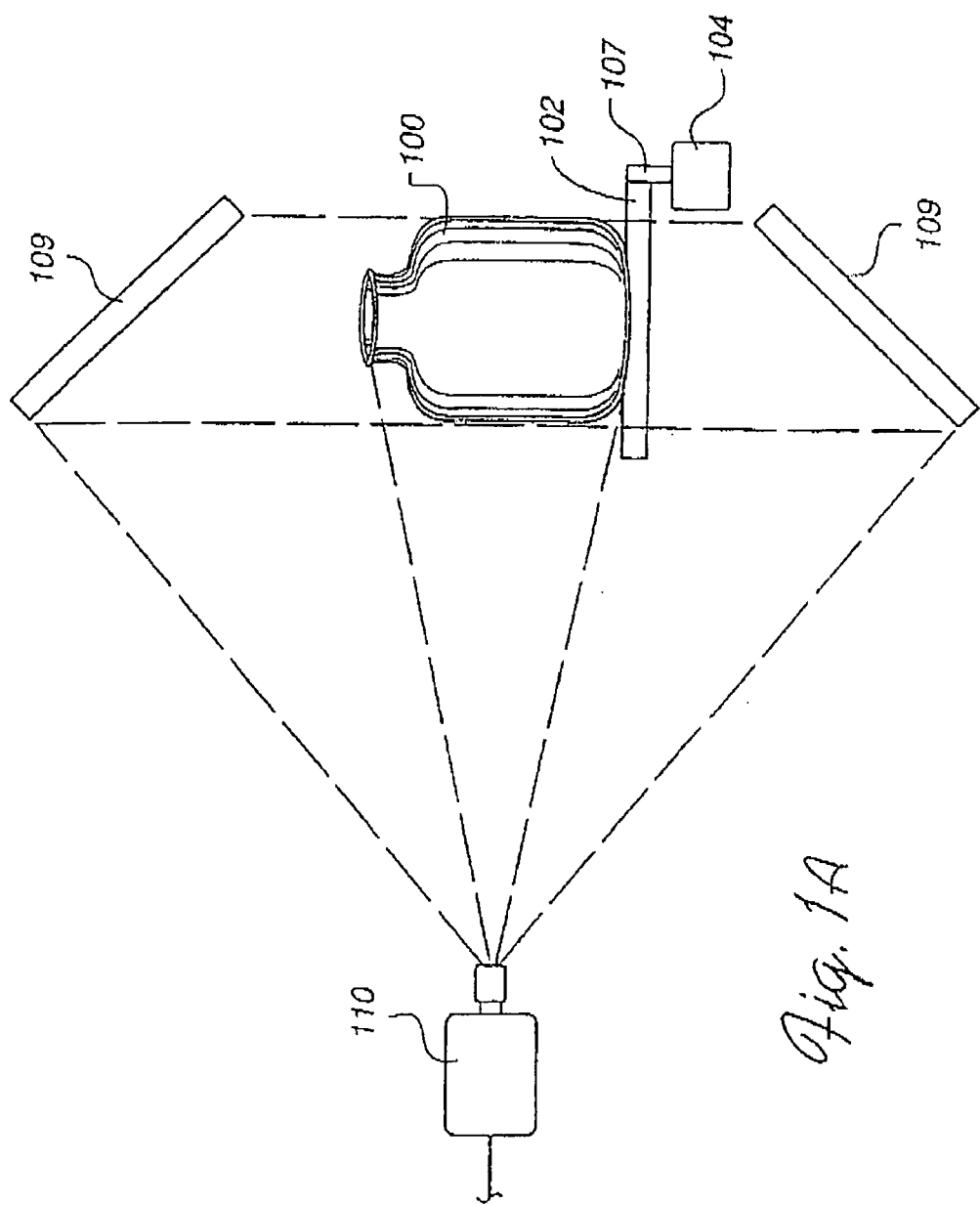

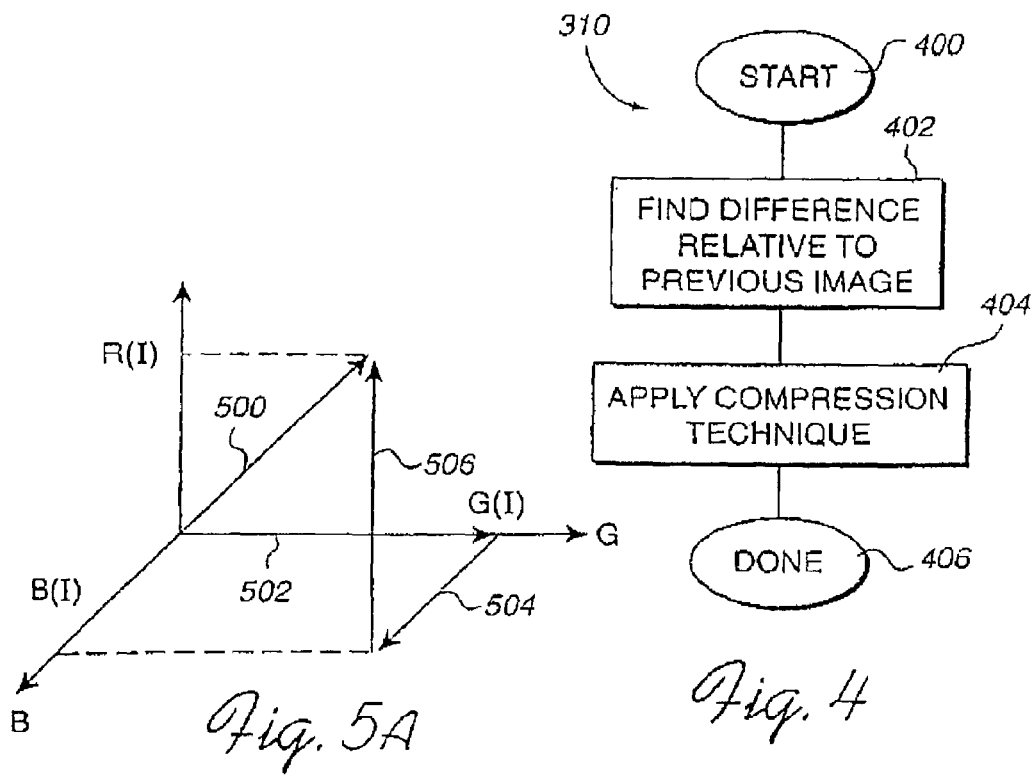
Fig. 5A
Fig. 4
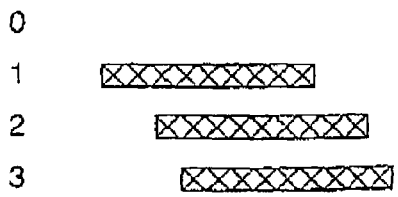
Fig. 5B
| 0 | NO | BLUE | | | |
|---|---|---|---|---|---|
| 1 | X(NC) | 8(+B) | Y(NC) | | |
| 2 | X(NC) | 2(-B) | 7(NC) | 2(+B) | Y-2(NC) |
| 3 | X+2 (NC) | 1(-B) | 7(NC) | 1(+B) | Y-1(NC) |
Fig. 5C

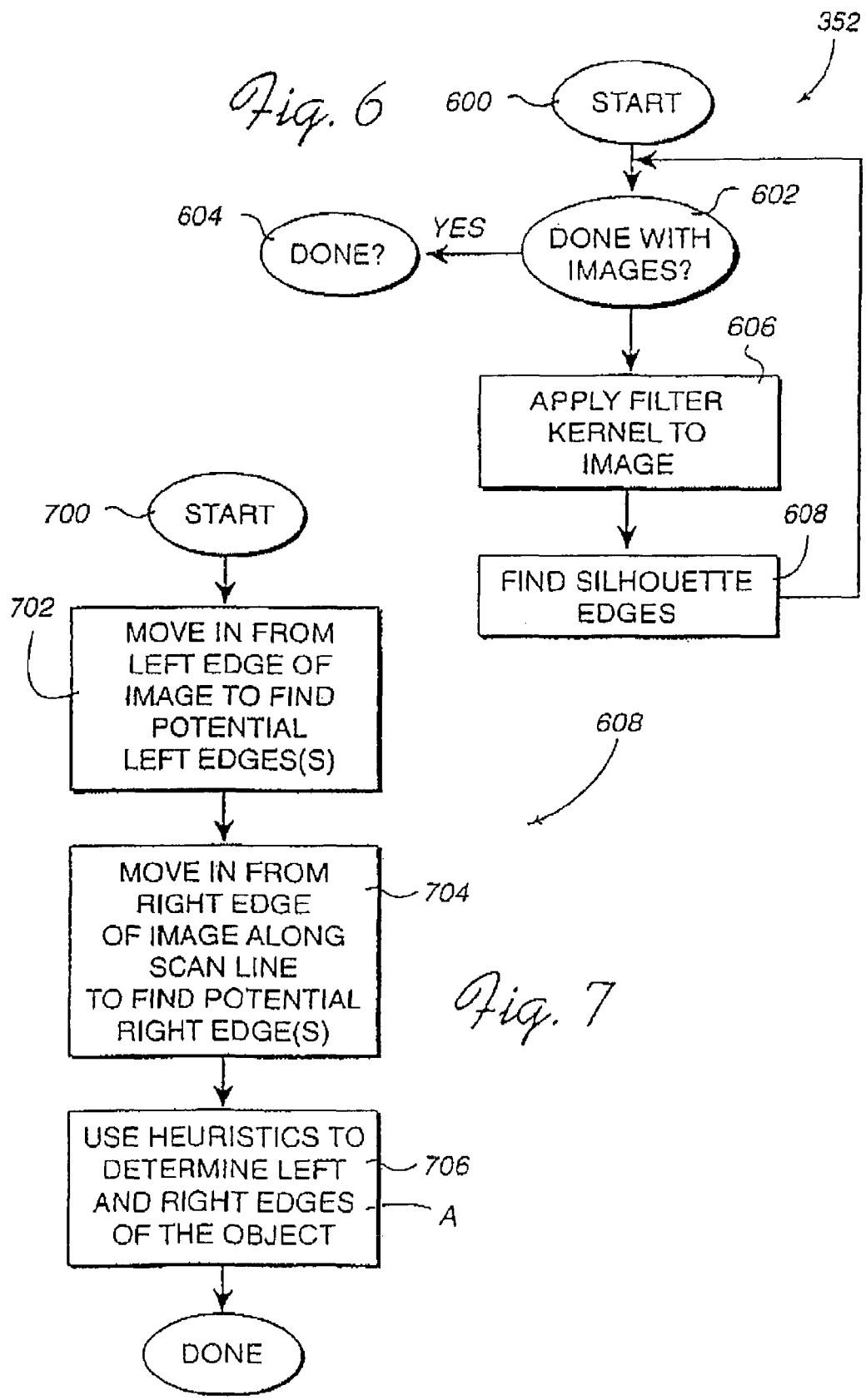

METHOD AND APPARATUS FOR SCANNING THREE-DIMENSIONAL OBJECTS

REFERENCE TO RELATED APPLICATIONS

This application is a continuation-in-part of U.S. application Ser. No. 09/945,133 filed on Aug. 31, 2001, now abandoned which is a continuation of U.S. application Ser. No. 09/236,727 filed on Jan. 25, 1999 now U.S. Pat. No. 6,288,385 issued on Sep. 11, 2001 which is a continuation of U.S. application Ser. No. 08/738,437 filed on Oct. 25, 1996, now U.S. Pat. No. 5,864,640 issued on Jan. 26, 1999 all of which are incorporated herein by reference.

Appendix A entitled SIGGRAPH 2001 Course: Acquisition and Visualization of Surface Light Fields is attached hereto and made a part hereof by reference.

1. Technical Field

This invention relates generally to optical scanners, and more particularly to optical scanners for providing a digital representation of three dimensional objects.

2. Background Art

Methods for successfully obtaining two dimensional ("2-D") color image data for objects have been developed. This process is commonly known as two dimensional scanning or digitizing. When an object is scanned, a digital data file is created which contains image data including color information which is associated with a set of two dimensional points or coordinates. The color information is obtained by an optical detector or set of optical detectors that are typically organized in a one or two dimensional array.

Matching the color information with the correct two dimensional point or location is not a significant problem in two dimensional scanning since the two dimensional point on which the optical detector is focused is the same point that is associated with the color information obtained by the detector. The color information is mislocated only to the extent that there is some error in the location of the point on which the detector is focused (e.g. an error introduced by the optical system) and that error can readily be minimized.

The problem of associating color information with three dimensional ("3-D") objects is not so easily solved. This is because prior art methods obtain color information with a two dimensional scanning method, while position information is obtained by a three dimensional scanning method. The mapping of the 2-D color information to the 3-D position information is a complicated process which is prone to significant error.

Many methods exist for obtaining the three dimensional location of the surface points of the object. One such method is a system, which uses a laser range finder to scan the object and record the distance between the known three dimensional location of the range finder and the measured location of the surface of the object. The result of using this method or other methods of generating three-dimensional surface models is a set of three dimensional points which accurately represent the surface of the object. A characteristic of this method and other methods of obtaining a three dimensional surface model is that it is inherently monochromatic, that is, no color information is obtained in the process. If three dimensional color information is desired, then it must be generated by somehow combining or conformally mapping the two dimensional color information onto the three dimensional surface model.

The problem of conformally mapping the two-dimensional color information onto the three dimensional surface model is difficult and it is common for mismatching of color information with the three dimensional points to occur. The problem may be visualized by imagining a white statue or bust of a person's head and a color photograph of the same person's face. The photograph cannot simply be projected onto the bust to transfer the correct color information to the correct points on the bust or significant distortion will occur. A significant amount of judgment must be exercised in order to correctly associate the color information from the photograph with the correct surface points on the bust. Similarly, it is difficult to accurately associate color information obtained from two dimensional optical detectors with the correct points on a three dimensional surface model. Another problem in the prior art is that color information is not used to determine surface locations, which means less than the total amount of information that is available is being used. Furthermore, both a 2-D and 3-D system is required, which adds cost.

What is needed is a way of generating a set of three dimensional points representing a surface in such way that the three dimensional points are already associated with color data so that conformally mapping separately generated color data onto the set of three dimensional surface points is not necessary. Furthermore, it is desirable to utilize all available frequencies of light to determine surface point positions to maximize the accuracy of the scanning process and to eliminate a separate 3-D scanning step.

DISCLOSURE OF THE INVENTION

Accordingly, the present invention provides a system and method for using the color information from a series of two dimensional color images to derive the three dimensional location in space of the surface points which produced the color images. Because the color information itself is used to derive the three-dimensional location of the surface points, there is no need to conformally map separately generated color information onto the derived three-dimensional surface points. The points are derived from color information and so are already associated with the correct color information. Also, the use of the color information increases the accuracy of the three dimensional location of the surface points.

In one embodiment, the present invention provides a three dimensional digital scanner which includes a multiple view detector which is responsive to a broad spectrum of visible light. The multiple view detector is operative to develop a plurality of images of a three dimensional object which is being scanned. The plurality of images are taken from a plurality of relative angles with respect to the object, and the plurality of images depict a plurality of surface portions of the object. A digital processor including a computational unit is coupled to the detector and is responsive to the plurality of images so that it develops 3-D coordinate positions and related image information for the plurality of surface portions of the object. A three dimensional image of the object to be scanned is thus developed by the digital processor. The data developed includes both shape and surface image color information.

In another embodiment, a three dimensional color digital scanner includes a color detector responsive to a broad spectrum of visible light to develop a plurality of images of a three dimensional object. A rotary object support having an axis of rotation allows the detector to develop a plurality of images of a three dimensional object. The plurality of images depict a plurality of surface portions of the object. A digital computer is coupled to the detector. The computer tracks patches of the surface portions of the object to determine coordinates of the patches as a function of the rotation of the rotary object support and determines radii of the patches from the axis of rotation.

In another embodiment, a method for scanning a three dimensional object includes developing a plurality of images of a three dimensional object taken from a plurality of relative angles with respect to the object. The plurality of images depict a plurality of surface portions of the object to be scanned. 3-D coordinate positions and related image information about the plurality of surface portions of the object is computed from the plurality of images such that a three dimensional image of the object is developed that includes both shape and surface image information.

In another embodiment, a method for determining three dimensional coordinates of a surface portion of an object includes obtaining a plurality of images of the surface portion of the object and identifying a trackable patch of the surface portion in an initial image. An initial set of two dimensional coordinates of the trackable patch in the initial image is determined along with at least one additional set of two dimensional coordinates of the trackable patch in another of the images. A radial coordinate of the trackable patch is determined and then a set of three dimensional coordinates of the trackable patch are determined from the radial coordinate of the trackable patch.

In another embodiment, a method for determining three dimensional coordinates of a surface portion of an object includes rotating the object about an axis of rotation so that a plurality of images of the surface portion of the object are obtained as the object is rotates about the axis of rotation. A trackable patch is identified and the two dimensional coordinates of the trackable patch are determined. The movement of the trackable patch is tracked as a function of the rotation of the object. A radial distance of the trackable patch from the axis of rotation is determined based on the movement of the trackable patch as a function of the rotation of the object and three dimensional coordinates of the surface portion of the object are derived from the coordinates of the trackable patch and the radial distance of the trackable patch from the axis of rotation.

The present inventions provides a system and method for obtaining 3-D surface information that is linked to color information without the need to conformally map 2-D color data onto a 3-D surface. The accuracy of the system is enhanced by the use of color data and the cost of the system is reduced because the 3-D surface is derived from a series of 2-D images. These and other advantages of the present invention will become apparent upon reading the following detailed descriptions and studying the various figures of the drawings.

BRIEF DESCRIPTION OF THE DRAWINGS

FIG. 1A illustrates an alternative embodiment of the present invention which enables the top and bottom portions of an object to be scanned.

FIG. 4 is a flow diagram illustrating a process performed on the images before they are stored.

FIG. 5A illustrates the vector nature of the color data obtained.

FIG. 5B illustrates an example of blue color data at times 0, 1, 2, and 3 for a line of pixels.

FIG. 5C illustrates how the data can be compressed by recording only the changes in the color data.

FIG. 6 is a flow diagram illustrating a process for identifying the silhouette of the object in each image.

FIG. 7 is a flow diagram illustrating a process for finding silhouette edges along each scan line.

BEST MODES FOR CARRYING OUT THE INVENTION

Figure 1:
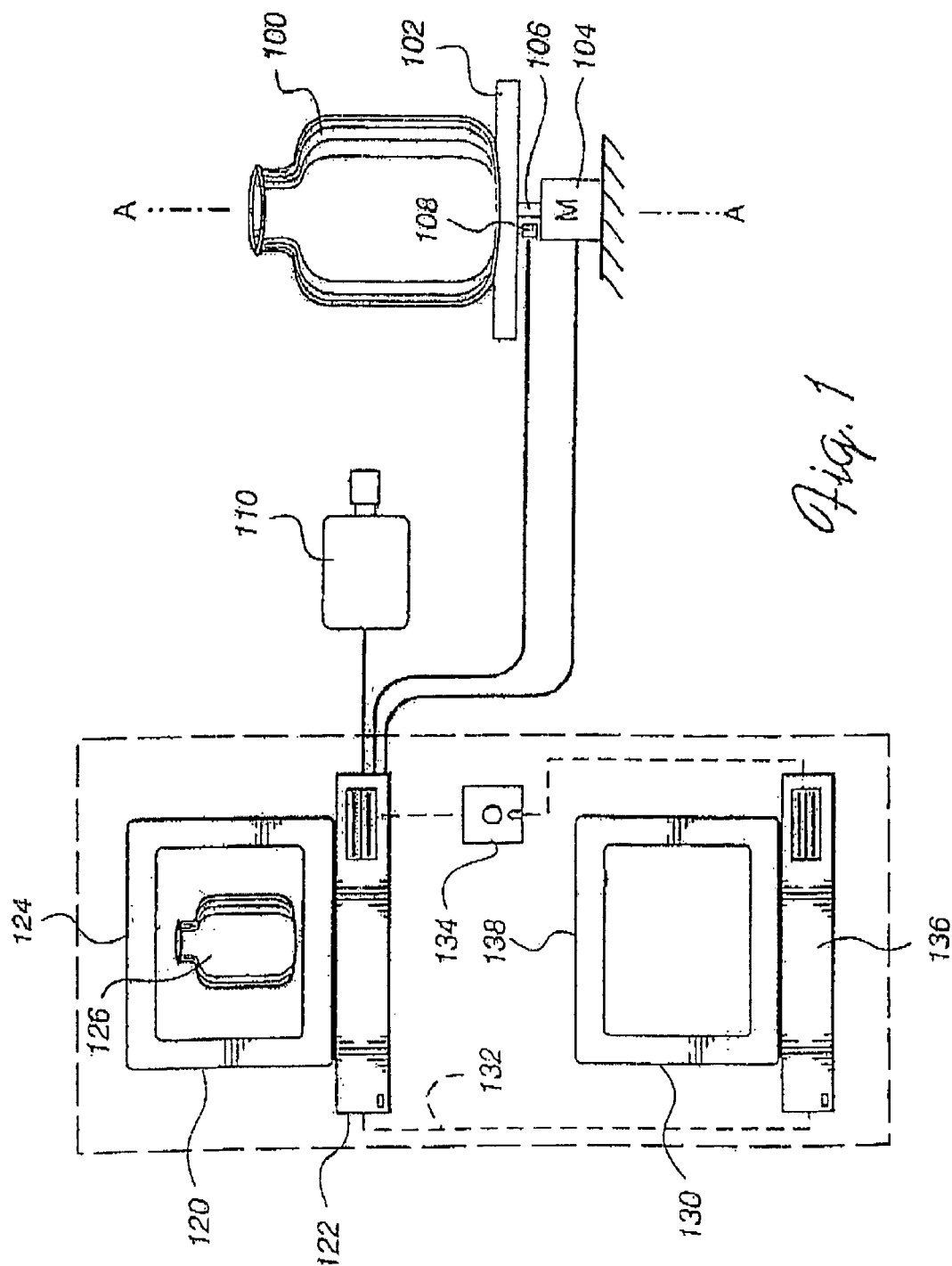
FIG. 1 illustrates a system for obtaining a series of two dimensional color images of an object and processing those images to obtain a three dimensional model of the surface of the object.

In FIG. 1, an embodiment of the present invention includes a system for obtaining a series of two dimensional color images of an object and processing those images to obtain a three dimensional model of the surface of the object. An object 100 which is to be digitized is placed on a rotatable platform 102. A motor 104 is provided to drive rotatable platform 102 via a shaft 106. A position encoder 108 detects the angular position of rotatable platform 102 and generates an electrical signal which represents the angular position of rotatable platform 102. An optical detector 110 (e.g. a color video camera) views object 100 and creates a two dimensional color image of object 100.

As object 100 is rotated by rotatable platform 102, detector 110 captures a series of color images of object 100. Each color image taken at a different time is associated with an angular rotation of object 100 about an axis of rotation, "A" which runs through shaft 106. Information about the angular position of object 100 is obtained from position encoder 108. Thus, each "snapshot" or image of object 100 taken by detector 110 from a different view is associated with data about the angle of rotation of object 100 with respect to detector 110. An image input processing system 120 ("computer") controls the image acquisition process and records the acquired images along with the associated angular position data. That is, processing system 120 is connected to detector 110 and receives data for each image or snapshot taken of object 100 from detector 110, and position encoder 108 sends angular position information to processing system 120, so that processing system 120 can associate the image data from detector 110 with the angular position data taken at the same time. In other embodiments, detector 110 is a film camera and processing system 120 receives data from a digitizer which digitizes the film images from detector 110.

Processing system 120 includes a processing unit 122 and a monitor 124 and also controls motor 104. A monitor 124 can display a current image 126 being captured by detector 110 or other information about the capturing process.

Once processing system 120 has obtained a series of images, those images are transferred to an image processor 130 ("computer"). Image processor 130 can receive data from processing system 120 in a number of different ways. Image processor 130 can be directly connected to processing system 120 via direct connection 132, or data from processing system 120 can be transferred to a removable storage medium such as disk 134 which may be read by image processor 130. Processing system 120 may also transfer data to image processor 130 via the Internet or a modem connection. Image processor 130 includes processing unit 136 and also includes monitor 138.

In other embodiments, processing system 120 and image processor 130 are combined on a single computer. The advantage of separating the functions of processing system 120 and image processor 130 is that the data acquisition and storage function performed by processing system 120 and control of the data acquisition system does not require a complex or powerful processor. On the other hand, image processor 130 receives data representing a series of two dimensional images and perform complex and computationally intensive operations on that data to produce a three dimensional surface model. Image processor 130 is therefore, given current technology, likely to be a more powerful (and costly) computer than processing system 120. If that is the case, then it is economically beneficial to utilize a large number of relatively cheap processors for data acquisition and temporary storage and send data from those relatively cheap systems to a smaller number of image processors which generate the three dimensional surface model from the set of two dimensional color images.

FIG. 1A illustrates an alternative embodiment of the present invention which enables the top and bottom portions of an object to be scanned. Again, object 100 is supported by rotatable platform 102 which is driven by motor 104. In this embodiment, shaft 107 engages the edge of rotatable platform 102, so that motor 104 and shaft 107 do not obscure the image of the bottom of object 100. Rotatable platform 102 is made from a transparent material so that the bottom of object 100 may be viewed through rotatable platform 102. A set of mirrors 109 are placed within the field of view of detector 110 so that images of the top and bottom surfaces of object 100 are captured by detector 110 in addition to the side views.

Figure 1B:
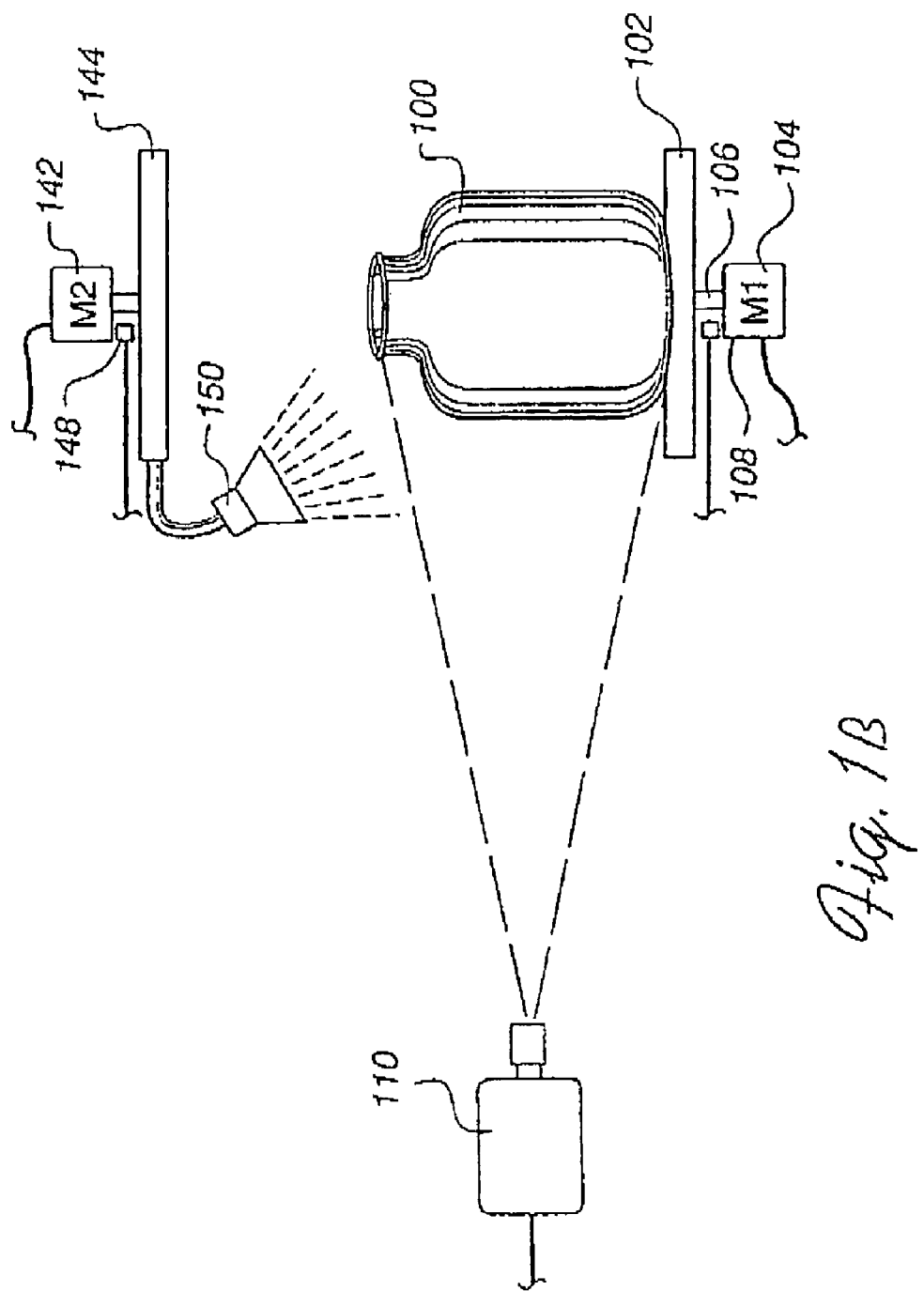
FIG. 1B illustrates another embodiment of the present invention which produces enhanced shading of an object.

FIG. 1B illustrates another embodiment of the present invention which is designed to produce contrast enhancing shading of object 100. Again, object 100 is supported by rotatable platform 102 which is driven by a motor 104 via a shaft 106. A second motor 142 also drives a rotatable platform 144 via shaft 146. Encoder 148 generates data representative of the rotational position of rotatable platform 144 and transmits that data to processing system 120. Likewise, motor 142 receives control commands from processing system 120. A light 150 is mounted on rotatable platform 144 to provide illumination of object 100. Light 150 is oriented to provide contrasting illuminated and shaded portions on object 100 which aid in the tracking of features on the surface of object 100. Because light 150 is mounted on rotatable platform 144 which is separately controllable by processing system 120, different orientations of light 150 with respect to object 100 may be checked to determine which one best enhances the surface features of object 100. When platforms 102 and 144 are rotated in a synchronized manner, the shading remains constant. Additionally, multiple sets of views of object 100 with different shadings can also be obtained by changing the relative position of platforms 102 and 144.

Figure 1C:
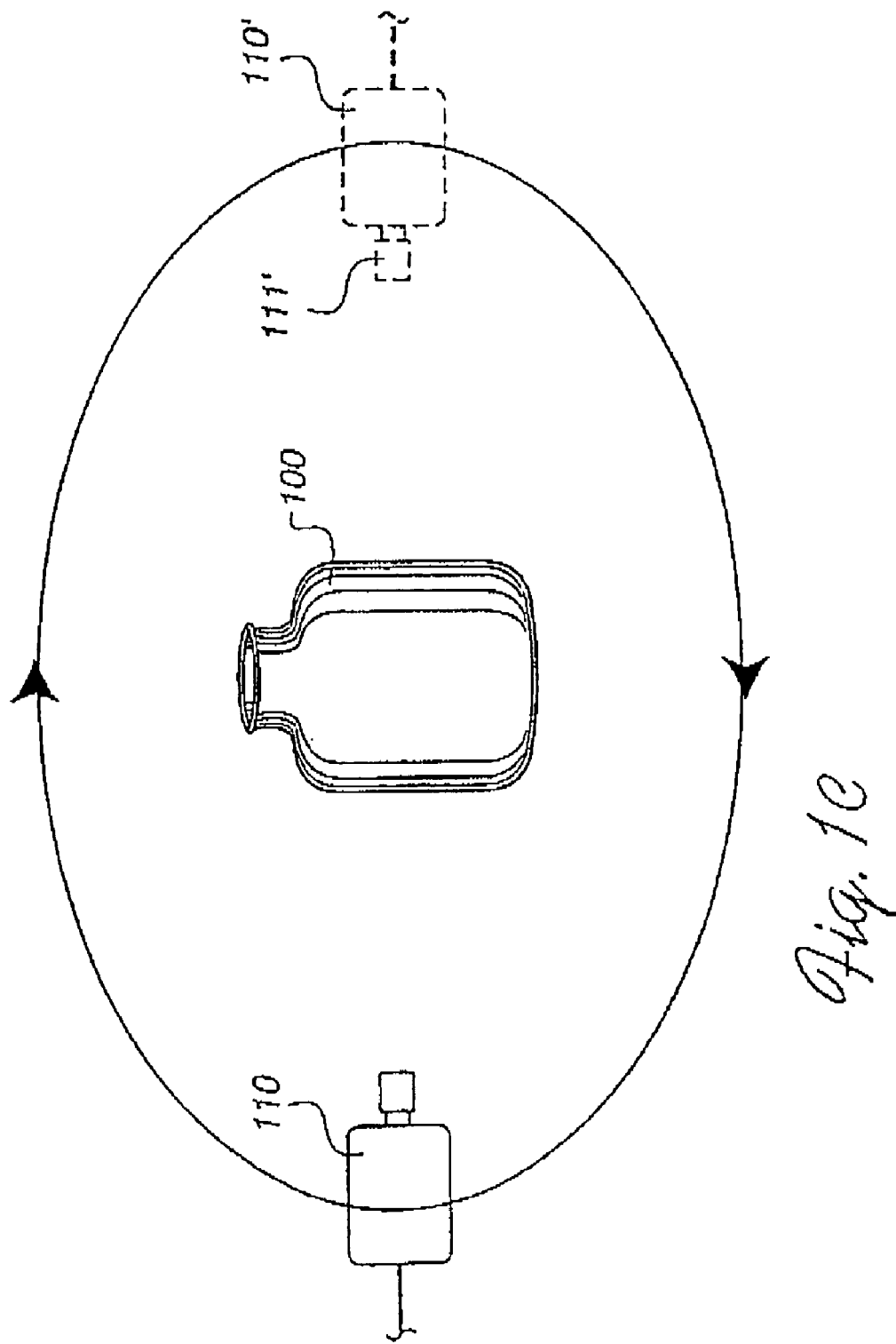
FIG. 1C illustrates an arrangement where a detector is translated about a stationary object.

FIGS. 1, 1A, and 1B each depict embodiments where in the object being imaged is rotated. In another embodiment of the present invention, the object remains stationary and the detector moves around the object. FIG. 1C illustrates an arrangement where a detector is translated about a stationary object. It should be noted that as the detector 110 is moved, the optics 111 remain pointed at the object 100. Detector 110 can be move in many ways and object 100 can be supported in many ways. In one embodiment, an unobstructed view of object 100 is obtained by suspending it from very thin wires. Detector 110 is translated about object 100. If object 100 is very large, detector 110 could be mounted on, for example, a helicopter and flown around object 100. It is not necessary that the motion of detector 110 be exactly circular around object 100. The angular and radial components of the motion of detector 110 with respect to object 100 can be computationally analyzed, as will be appreciated by those skilled in the art. As long as the position of detector 110 is measured and recorded, the relative angular position of detector 110 with respect to object 100 can be determined for each image taken by detector 110. Methods of determining the position of detector 110 include using GPS or a laser positioning system. Once the angular component of the motion is analyzed and the radial component is calculated, the system compensates for the radial component and the images generated by detector 110 can be processed similarly to the images generated by a system that includes a rotating object and a stationary detector.

Figure 1D:
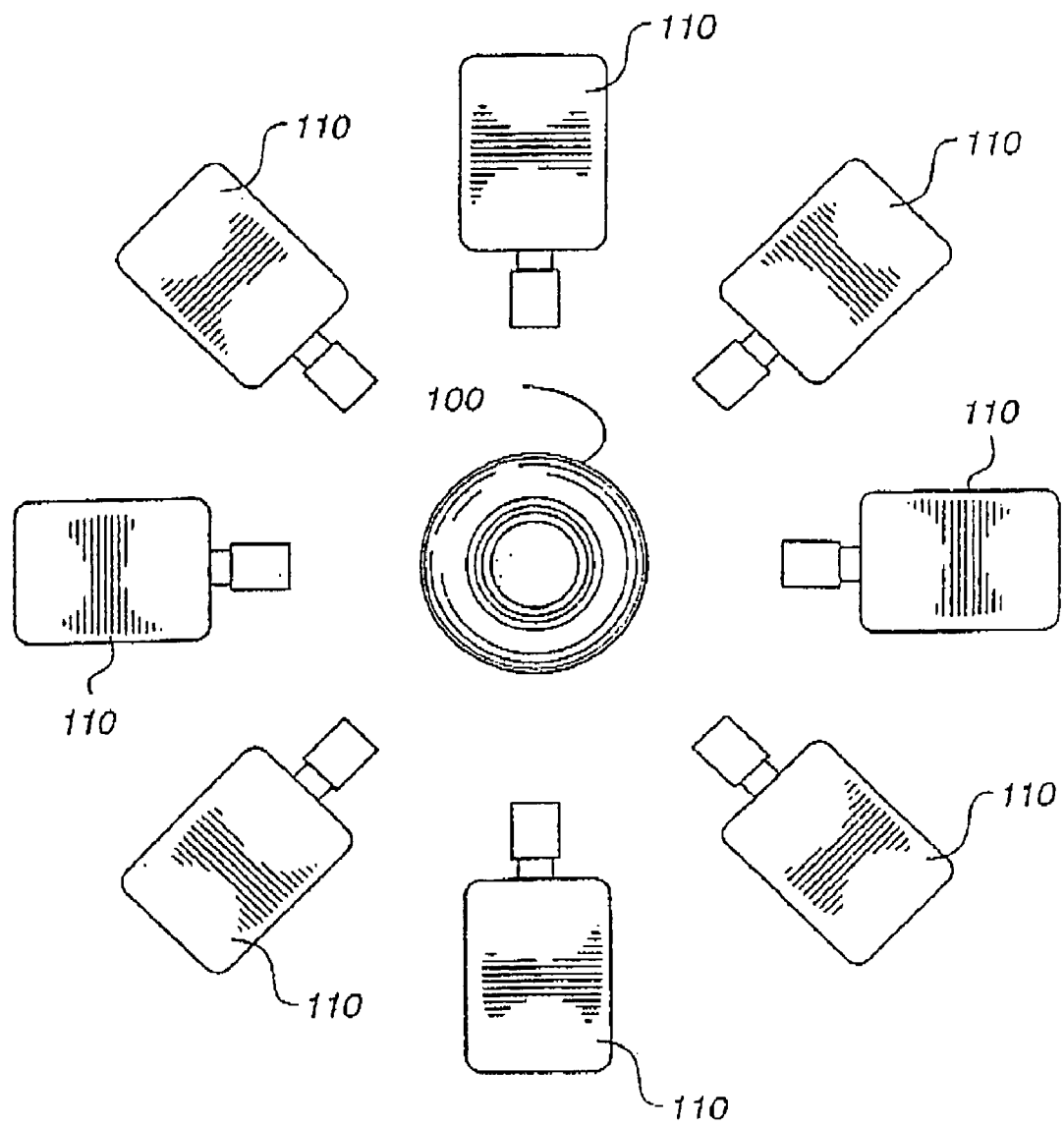
FIG. 1D illustrates an embodiment of the present invention which uses a multiple number of detectors instead of moving a single detector.

FIG. 1D illustrates an embodiment of the present invention which uses a multiple number of detectors instead of moving a single detector. A top view of object 100 is shown and set of detectors 110 are provided at different angular displacements with respect to object 100. The advantage of this embodiment is that no motion is required and the need for motors, encoders, and rotatable supports is limited. The image of object 100 captured by each detector is angularly displaced with respect the images captured by the other detectors and so the images may be processed in a similar manner as successive images taken by one moving detector.

The cost of multiple detectors 110 may be less than the cost of a rotatable drive or a mechanism for moving detector 110 and recording the position of detector 110. Another advantage of this approach is that all of the images of object 100 can be created simultaneously.

FIGS. 1 through 1D depict various embodiments for creating multiple images of object 100 with object 100 and detector 110 at different relative angular displacements. Each of these systems provide two dimensional color images of object 100 observed at different angles. This two dimensional information is converted into a three dimensional surface model of object 100 by the process and apparatus of the present invention.

Figure 2:
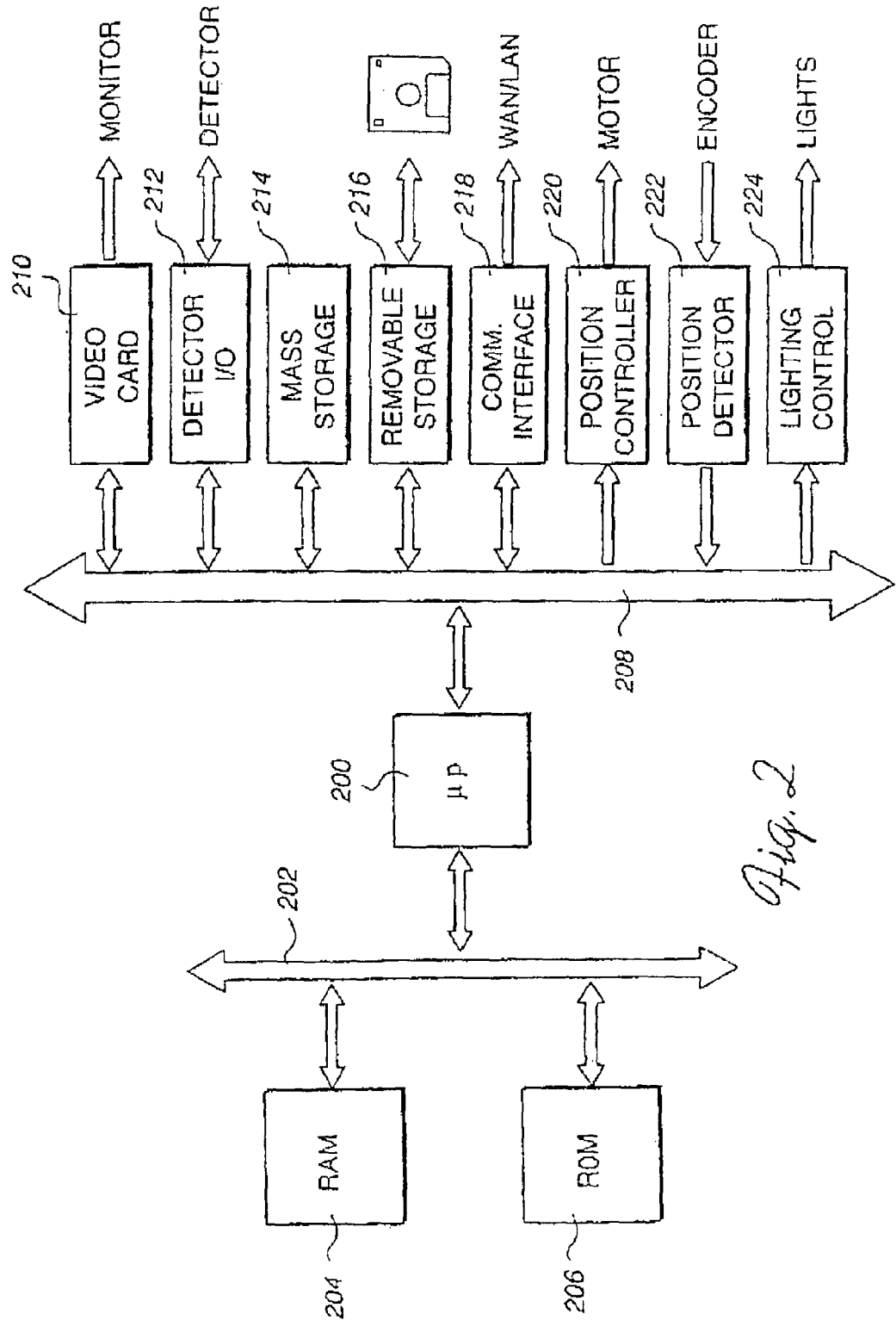
FIG. 2 illustrates in detail architecture of an image acquisition system.

FIG. 2 illustrates in detail the architecture of processing system 120 used in some embodiments. A microprocessor 200 is connected to a memory bus 202 and memory bus 202 is connected to a RAM 204 and a ROM 206. Microprocessor 200 is also connected to an input/output ("I/O") bus 208. A video interface 210 is coupled to I/O bus 208 to control monitor 124, as is detector interface 212. Detector interface 212 buffers and processes data from the detector and also carries output commands to the detector from microprocessor 200. In certain embodiments where a moving detector is used, the detector provides its own control and records its own position. In such embodiments, the detector/processor interface need only be capable of transferring data from the detector, including both image and detector position data, to the processor storage system.

Mass storage 214 (such as a hard disk drive) is also connected to input/output bus 208 and provides storage capacity for the multiple images generated by the optical system. Removable storage 216 (such as a floppy disk drive) also provides a way of transferring data files to and from processing system 120 and another processing system. Alternatively, communications interface 218 can be used to transfer files as well. Communications interface 218 may be connected to a local area network ("LAN") or wide area network ("WAN") for communication with other workstations. Position controller 220 is connected to input/output bus 208 and provides control to a motor in embodiments where processing system 120 provides control commands for rotating object 100. In such embodiments, position detector 222 receives data from an encoder so that processing system 120 may keep track of the position of object 100. Lighting control 224 is also connected to input/output bus 208 and is used to control the position of lights which may be moved with respect to object 100. Lighting control 224 also controls the intensity of those lights.

The architecture shown for processing system 120 in FIG. 2 is capable of supporting any of the embodiments shown in FIGS. 1–1D. If the object is to be rotated, position controller 220 and position detector 222 provide control of the rotation. Position information about object 100 can be integrated with image data from interface 212 and stored in mass storage 214. Movement and intensity control of the light is controlled by lighting control 224. If an autonomous detector is used, data about the detector position and images captured by the detector can be transferred to processing system 120 via communications interface 218 or removable storage 216. Multiple detector interfaces are provided to control a multiple number of detectors in embodiments which use more than one detector. As described above, a three dimensional surface model can be computed using microprocessor 200 and the data contained in mass storage 214, or, alternatively, the data in mass storage 214 can be transferred to a more powerful image processing system.

Figures 3A, 3B:
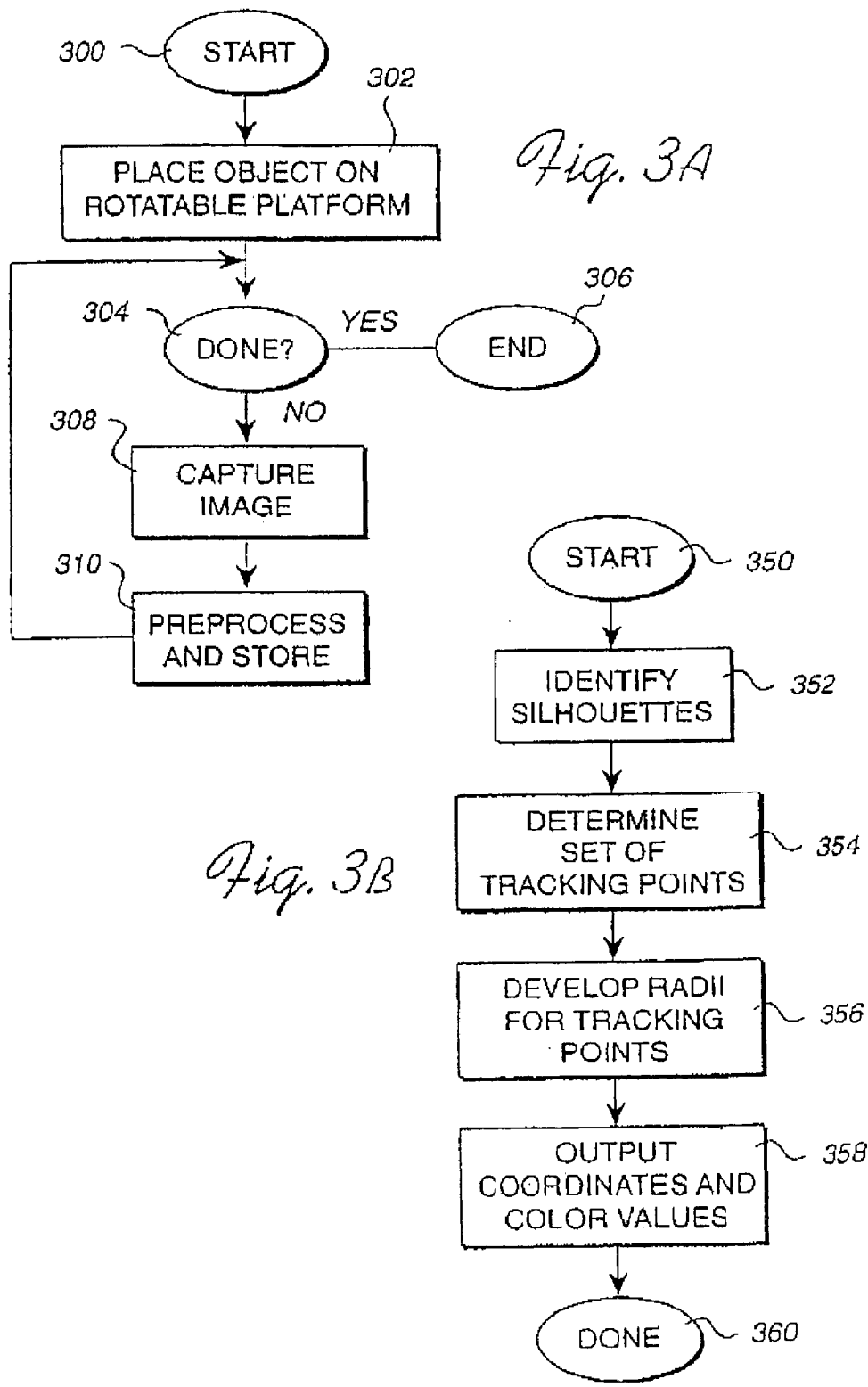
FIG. 3A is a flow diagram illustrating a process of obtaining multiple images of a rotating object.
FIG. 3B is a flow diagram illustrating a process for generating three dimensional surface data from the two dimensional images of the object.

FIG. 3A is a flow diagram for the process of the present invention of obtaining multiple images of a rotating object. Preferably, the method is implemented on a processing system 120. The process starts at step 300, and the user places the object on the rotatable platform in step 302. The object begins to rotate while it is being imaged by a detector. In step 304, the processor checks whether the required of number images have already been captured or taken. If the required number of images have been captured, then the process is finished at step 306. The two dimensional image data is then ready to be taken to an image processor for generation of a three dimensional surface model. If more images are to be captured, then control is transferred to step 308, and a command is sent to the detector to capture an image. The image is preferably preprocessed and stored in step 310, and control is transferred back to step 304. Once the process depicted in FIG. 3A is complete, a set of two dimensional color images of the object has been obtained at different relative angular displacements between the detector and the object.

FIG. 3B illustrates the process implemented on image processor 130 for generating three dimensional surface data from the two dimensional images of the object developed by the process illustrated in FIG. 3A which was implemented on processing system 120. The process begins at step 350 and in a step 352, the processor identifies the silhouette of the object in each of the two dimensional color images of the object provided by the image acquisition system. This silhouette information will be used to reduce the area in each image that must be processed. In step 354, a set of tracking points is determined within the silhouettes of the object. These tracking points are associated with surface features of the object which are identifiable in different images of the object taken by the optical detector. The portion of the image of the object which corresponds to the identifiable feature is referred to as a trackable patch. Each trackable patch consists of a group of pixels surrounding a geometric point on the surface which is being scanned. The trackable patch is thus a feature associated with and proximal to the geometric point. The patch is distinguishable from adjacent surface locations and therefore trackable. The trackable patch is tracked through a series of images of the object taken at different relative angular displacements between the object and the detector. Step 356 develops a radius from the axis of rotation for each trackable patch which will account for the motion of the trackable patch in the images. The radius of the trackable patch is used to approximate the radius to the geometric point associated with the trackable patch.

Once step 356 is completed, a three dimensional surface consisting of the points which correspond to each trackable patch and interpolations between those points has been generated. In step 358, coordinates of the points corresponding to the modeled surface are output in a standard format. In some embodiments, the raw trackable patch points are output. In other embodiments, points are interpolated between the raw trackable patch points, so that a regular array of points representing a three dimensional surface is generated. Each trackable patch point is already associated with a color value because the trackable patch points are associated with the trackable patch color information. The color value of the trackable patch is simply attributed to the point determined for that patch. Step 358 outputs the coordinates and their color values. The process is completed at 360.

The process of FIG. 3B generates three-dimensional surface data from a set of a two dimensional images in a manner that associates color information with the three dimensional points during the generation of those points. Indeed, the color information is used to identify the points which are tracked thereby enhancing the tracking process. The system does not identify the surface of the object independent of color image information and then match the surface points to color information. In the system depicted in FIG. 3B, optical detectors obtain color images of the object. The 3-D surface points of the object are not determined independently from that color image information. In fact, the surface points of the object are not directly determined, rather, the locations of the features located on the surface are determined. Those surface features include color information. Therefore, the locations of color features are directly determined and do not need to be mapped onto a surface model which is independently generated. The regularly spaced points of the surface model are then generated from the points representing the color surface features by interpolating between the surface feature points.

FIG. 4 illustrates a process 310 that can be performed on the images before they are stored. The process starts at 400. Step 402 analyzes the difference between the current acquired image and the previous acquired image. Step 404 applies a compression technique to the data to reduce the amount of storage space taken up by the data. The process is finished in step 406. Thus, in this embodiment using process 310, the data is compressed for more compact digital storage.

FIGS. 5A, 5B, and 5C further illustrate the color image pixel data and a compression technique implemented in one embodiment of the invention. FIG. 5A illustrates the vector nature of the color data obtained. In the example, shown, red-green-blue ("RGB") color data is used. This or any other color scheme such as cyan-magenta-yellow black ("CMYK") can be implemented in accordance with the present invention. The three axes shown in FIG. 5A are labeled R, G, and B. Color values can be represented as vectors directed to points in this color space. For example, vector 500 represents the color value of a pixel. The values of R, G, and B are represented by the point to which vector 500 is directed. Vector 500 is the sum of the green component vector 502, the blue component vector 504, and the red component vector 506. Thus, for each point, there is a vector in color space describing the color of the point. The position or pixel location of the point is stored along with the three dimensions of color information which represent the intensities of the three color signals, RGB.

FIG. 5B illustrates an example of what the color data for the color blue looks like at times 0, 1, 2, and 3 for a line of pixels. At time 0, no blue color surface feature is being imaged by the line of pixels. At time 1, a surface feature with a blue component has moved into the position being imaged by the line of pixels, so that 8 blue pixels are observed after X number of no blue pixels are observed. Following the 8 blue pixels, Y pixels of no color are again observed. In this example, only one intensity of blue is shown for the purpose of simplicity. In an actual example, varying intensities of blue could also be observed and recorded. At time 2, the surface feature has moved to the right and now X+2 pixels are observed with no blue and 8 pixels are observed with blue again. Y–2 pixels of no color are observed next. At time 3, the blue feature has moved to the right one more pixel and so X+3 pixels of no color are observed followed by the 8 blue pixels followed by Y–3 pixels of no color.

It can be appreciated that recording the color value of each pixel for each color would generate a large amount of data. FIG. 5C illustrates how the data can be compressed by recording only the changes in the color data, and then using run length encoding for those changes. Run length encoding techniques are well known to those skilled in the art. At time 0, no color is observed, and so the data stored is simply no color or black. At time 1, X pixels are still no color, so that number of pixels is recorded and associated with no change. Next, 8 pixels have changed color to blue and so 8 pixels are recorded as having a positive blue change. Finally, the remaining Y pixels have not changed, so Y pixels, no change is recorded. At time 2, the X pixels on the left side which had no color have not changed and so X pixels are recorded as having no change. Since the blue image has shifted two pixels to the right, the next two pixels which were formerly blue now have no color. Both pixels are recorded as two negative blue pixels since the color change for them was negative blue representing the loss of blue color. The next 6 pixels were formerly blue at time 1 and remained blue at time 2 and so no change is recorded for the next 6 pixels. The next two pixels were formerly not blue and have become blue. Therefore, the next two pixels are recorded as having positive blue value representing a positive blue change between time 2 and time 1. The next Y–2 pixels were blank during time 1, and remain blank during time 2, so no change is recorded for the next Y–2 pixels.

At time 3 the blue feature has moved one more pixel to the right. The first X+2 pixels in the linear array had no color at time 2 and still have no color at time 3. Therefore, no change is recorded for the first X+2 pixels. The next pixel was formerly blue but, since the blue feature has moved one pixel to the right, that pixel is now has no color. Therefore a negative blue color change is recorded for that pixel. The next 7 pixels were blue at time 2 and remain blue at time 3. Therefore, no color change is recorded for those 7 pixels. The next pixel had no blue color at time 2 and has a blue color component at gtime 3. A color change of positive blue is therefore recorded for that pixel. Finally, the Y–1 remaining pixels were formerly blank at time 2 and remain blank at time 3 and so no change is recorded for those Y–1 pixels.

From this example, it can be seen that as a surface feature moves across the pixels at successive times, it is possible to represent the image of the feature by recording only the changes in color values for each pixel at each successive time. Successive pixels which do not change color can be simply noted without the need to store three dimensions of color value for each individual pixel. This is only one example of a data compression scheme which is used in one embodiment of the present invention. Other compression techniques can be used as alternatives to or can be used in combination with this compression technique. It is only required that the data be stored in a format which will be accessible and expandable later on for processing of the two dimensional images to determine a three dimensional surface. Alternatively, if storage capacity is not a problem, changed and so X pixels are recorded as having no change. Since the blue image has shifted two pixels to the right, the next two pixels which were formerly blue now have no color. Both pixels are recorded as two negative blue pixels since the color change for them was negative blue representing the loss of blue color. The next 6 pixels were formerly blue at time 1 and remained blue at time 2 and so no change is recorded for the next 6 pixels. The next two pixels were formerly not blue and have become blue. Therefore, the next two pixels are recorded as having positive blue value representing a positive blue change between time 2 and time 1. The next Y–2 pixels were blank during time 1, and remain blank during time 2, so no change is recorded for the next Y–2 pixels.

At time 3 the blue feature has moved one more pixel to the right. The first X+2 pixels in the linear array had no color at time 2 and still have no color at time 3. Therefore, no change is recorded for the first X+2 pixels. The next pixel was formerly blue but, since the blue feature has moved one pixel to the right, that pixel is now has no color. Therefore a negative blue color change is recorded for that pixel. The next 7 pixels were blue at time 2 and remain blue at time 3. Therefore, no color change is recorded for those 7 pixels. The next pixel had no blue color at time 2 and has a blue color component at time 3. A color change of positive blue is therefore recorded for that pixel. Finally, the Y–1 remaining pixels were formerly blank at time 2 and remain blank at time 3 and so no change is recorded for those Y–1 pixels.

From this example, it can be seen that as a surface feature moves across the pixels at successive times, it is possible to represent the image of the feature by recording only the changes in color values for each pixel at each successive time. Successive pixels which do not change color can be simply noted without the need to store three dimensions of color value for each individual pixel. This is only one example of a data compression scheme which is used in one embodiment of the present invention. Other compression techniques can be used as alternatives to or can be used in combination with this compression technique. It is only required that the data be stored in a format which will be accessible and expandable later on for processing of the two dimensional images to determine a three dimensional surface. Alternatively, if storage capacity is not a problem, data compression can be eliminated.

In other embodiments of the invention, surface attributes other than color are derived and stored in connection with the three dimensional surface data. For example, specularity, emissivity, and absorption can be derived from the surface geometry and the orientation of the local surface in multiple views at multiple angles with respect to the surface. In certain embodiments, these attributes also aid in distinguishing trackable patches.

FIG. 6 illustrates the process 352 that identifies the silhouette of the object in each image. The process starts at 600. Step 602 tests whether the process is finished with the images. If the processor is finished with the images, then the process terminates at step 604. If more images remain to be processed, step 606 applies a filter kernel to the image which is herein incorporated by reference. As is known to those skilled in the art, a filter kernel is a set of coefficients which is convolved with an image (an XY array of pixels). Certain filter kernels, such as the Canny and Sobel kernels, highlight edges by producing a high correlation at locations which represent edges in images. Edge detection using filter kernels is described in: "On Detecting Edges" by Nalwi, PAMI, Chapter 8, pp. 699–714; "Finding Lines and Edges in Images" by Canny, MIT Technical Report TR-720, 1984; "On Calibrating Computer Controlled Cameras for Perceiving 3D Scenes" by Sobel Artificial Intelligence, Vol. 5, pp. 185–198, 1974; and "A Comprehensive Approach to Edge Detection" by Canny, PAMI, Chapter 8, pp. 679–698, 1986. By correlating the filter kernel with the image at all points, it is possible to determine the edge of the object for the object silhouette, by analyzing the correlation value. The silhouette edges are determined in step 608. Control is transferred back to step 602 to check whether there remain other images to be processed for silhouettes.

The purpose of determining the silhouette of the image is to constrain the amount of area over which surface features are searched for and identified for the object. A flying insect or a noise spike recorded by the detector may exist outside the area of the object shown in a given image. Noise spikes or insects may appear to be a good candidate to a be a trackable surface feature, but if the silhouette or edge of the object has been determined and the insect or noise spike is outside of that edge, then it will not be designated as a possible trackable surface feature. This simplifies the search for surface features and reduces computer processing of the image data by limiting the area to be searched and also prevents extraneous surface feature points from being identified and mapped as surface points. In certain embodiments, the search for surface features is further limited to an area within the silhouette as is described below.

FIG. 7 illustrates further detail regarding process 608 of FIG. 6 wherein silhouette edges are found along each scan line. The process starts at 700. In step 702, the processor begins at the left edge of the image and correlates the kernel with the pixels of the image to find a correlation maximum which corresponds to a potential left edge. In step 704, the processor moves in from the right edge of the image and correlates the kernel with the image data to find potential right edges. In step 706, a heuristic algorithm is used to determine left and right edges of the object. In this step, edges are distinguished from bugs or blips by the nature of the edge. In one embodiment this is accomplished by distinguishing between the continuous nature of an edge verses the isolated spatial nature of a spec or blip. Any alternative heuristic algorithm which exists for determining edges in such instances may be used within the scope of the present invention.

Figure 8:
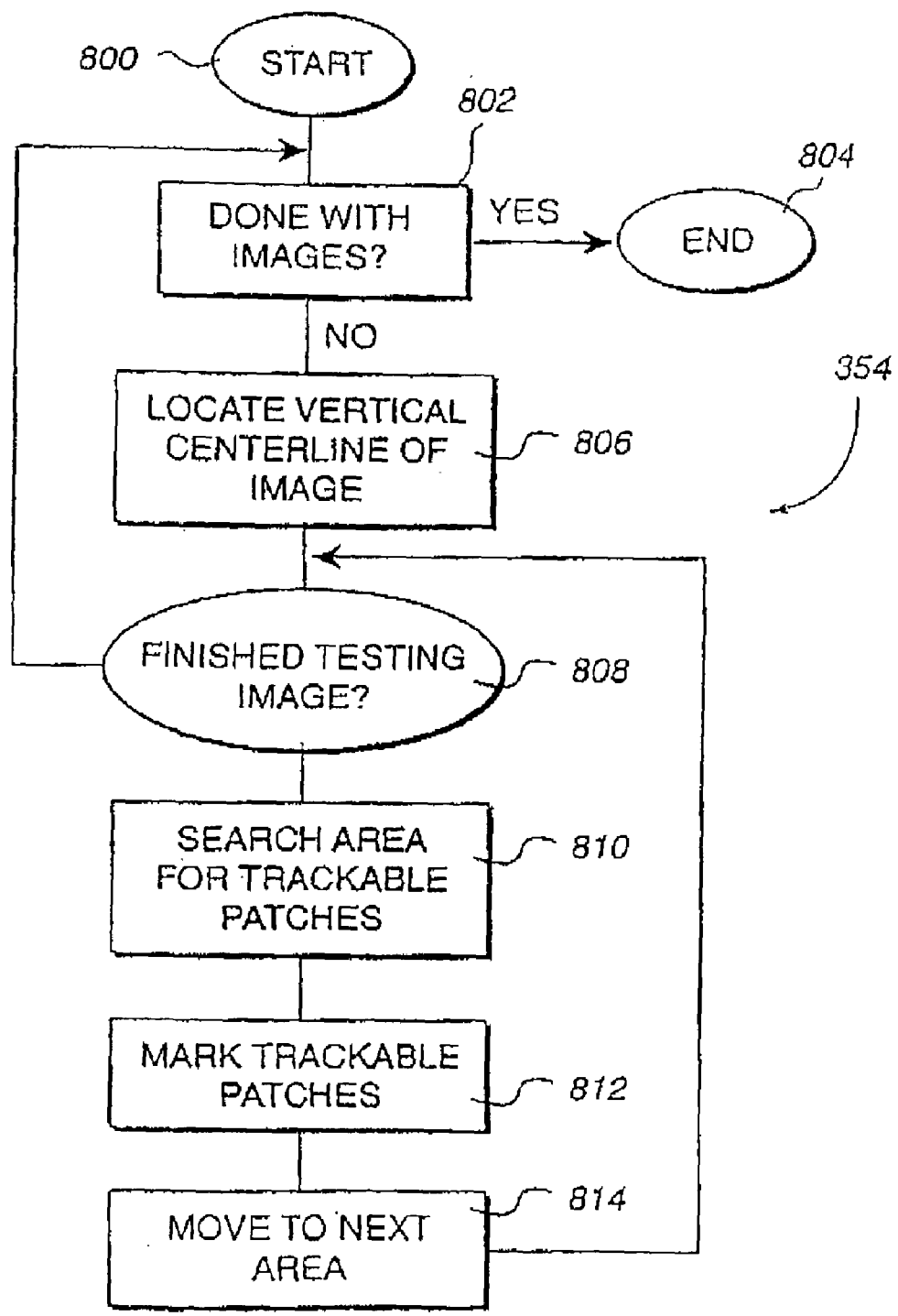
FIG. 8 is a flow diagram illustrating a process for determining a set of trackable patches.

FIG. 8 illustrates the process 354 of FIG. 3B implemented to determine a set of trackable patches. The process starts at 800. Step 802 determines whether the processor is finished with all images. If the processor is finished, the process ends at step 804. If the processor is not finished, control is transferred to step 806 and the processor locates the vertical center line of the image being processed. Next, the processor steps through the image to look for trackable patches starting at the center of the image and searching outward.

The size and dimensional nature of the trackable patches varies in different embodiments. In certain embodiments, trackable patches are searched for in individual scan lines, so that the trackable patches are one dimensional. In other embodiments, the trackable patches are searched for across several scan lines at once so that the patches are two dimensional. The size of the trackable patch searched for is fixed in some embodiments at a certain pixel area, for example 10.times.10. In other embodiments, the area of the trackable patches is not predetermined and may vary in size for different areas of the image. This enables the system to be flexible and select trackable patches of an optimal size for the type of trackable features found on the object. In general, when an "area" is referred to as being checked for trackable patches, any size or dimension area is intended, including a line of pixels.

Step 808 checks whether the processor is finished testing all parts of the image. If the processor is finished, then control is transferred back to step 802. If the processor is not finished, then the next unsearched area of the image is searched and analyzed to determine if it contains any trackable patches in step 810.

A number of ways exist for determining whether an area or section of the image is a good candidate for a trackable patch. A good trackable patch is a series of pixels which have RGB vector values which are readily identifiable and distinguishable from the RGB vector values in other areas of the image. Therefore, a distinctive coloration of a patch is an asset to its trackability. The trackable patch RGB vector values will be correlated with the RGB values in other images which represent other views of the object. If the trackable patch is readily distinguishable, then the correlation will yield a distinct spike at the new location of the trackable patch in the other images and the patch will be successfully found or tracked.

A number of methods exist for determining how unique or identifiable a given area in an image is, and therefore whether the area is a good candidate to be designated as a trackable patch. One method is to compute the variance values of the pixels within the area. A high variance value will indicate that the pixel values are changing and thus will at least be readily distinguishable from a solid or unchanging color background. A more sophisticated method is to convolve different kernels with the image area being tested to judge the quality of the surface features and its likelihood of being trackable. Standard kernels such as those defined in Canny and Sobel, supra, can be defined as a standard kernel used to check for trackable patches. Alternatively, a learning or smart system in some embodiments has the capability of developing customized kernels on the fly which are optimized for the type of surface features found on the object being scanned. The size of trackable patches, and the kernels used to identify them may be held constant or may be varied.

As noted above, step 806 locates the vertical center line of the image. The system begins at the vertical center line of the image and the search proceeds outward for trackable patches. The reason that trackable patches are first looked for at the center line of the image is that surface features are most likely to be completely and accurately sensed without distortion when they are observed head-on by the detector. However, areas to the left or right of the centerline can also be used. As surface features rotate away from the center line of the object, they will eventually pass out of the view of the detector. Before passing out of the view of the detector, the surface features will begin to become partially obscured and distorted as they are viewed obliquely by the detector. For example, at a 45 degree angle, a circle on the surface of the object will appear to the detector to be an oval. Obscured and distorted surface features are more difficult to accurately track because they change between images and it is also difficult to define a consistent location point for them.

Figure 8A:
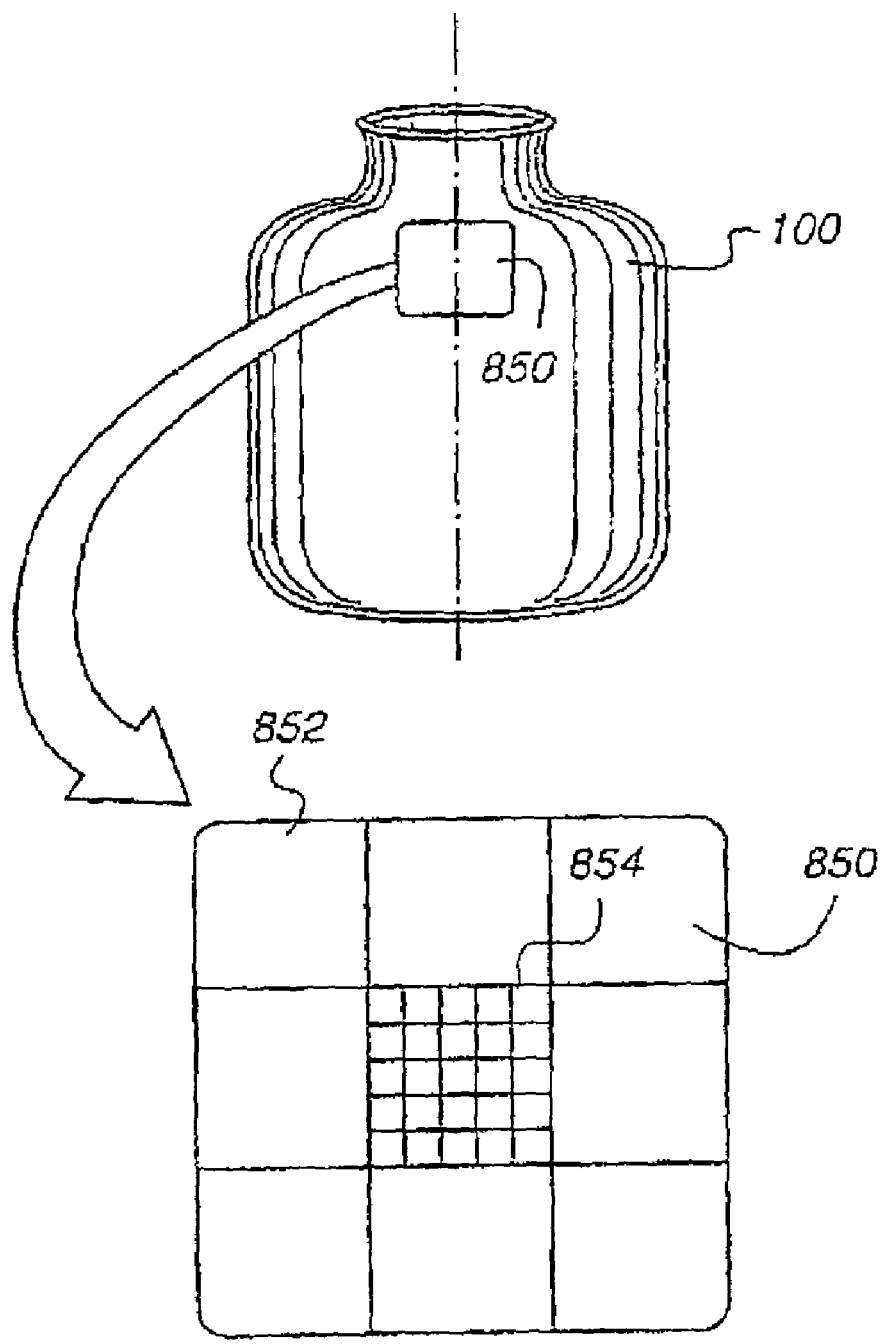
FIG. 8A illustrates how to search an image for trackable patches.

In step 812, the processor marks the trackable patches found in the area searched. This includes storing the color data for the pixels in the patch and storing the location of the patch. In step 814, the processor increments a distance away from the center line to define a new area to search and control is transferred to step 808. As noted above, step 808 determines if the image is finished being tested. In one embodiment, this is done by checking whether the entire area within a maximum distance from the center has been searched. The distance from the center line over which the processor will search for trackable patches can also be varied. FIG. 8A illustrates an image being searched for trackable patches by the process 810 of FIG. 8. The top portion of FIG. 8 illustrates object 100 and area 850 which is magnified below. Area 850 consists of a number of areas or sections 852 which, in turn, consists of pixels 854. Area 850 is located at the center line of object 100 and so will be tested by the processor on its first pass. Each section 852 of area 850 will be checked to determine whether it is a good candidate for a trackable patch. The vector color data from the pixels 854 is checked to see if it contains characteristics which are expected to be readily identifiable and distinguishable from other areas.

As noted above, the processor begins at the center line, $C_{sub.i}$ and checks outward for good trackable patches because features are most likely to be identifiable at the center. In other embodiments, the computer can check for patches starting with a location other than the center of the image. In FIG. 8A, the trackable patches are shown as squares which have a predetermined area or number of pixels, in this case, five by five. In other embodiments, the trackable patches have variable or irregular sized areas. Different predefined sized areas can also be used. The important feature is that patches on the surface are identified in the image so that the points corresponding to those patches can be determined and tracked in other images.

Figure 9A:
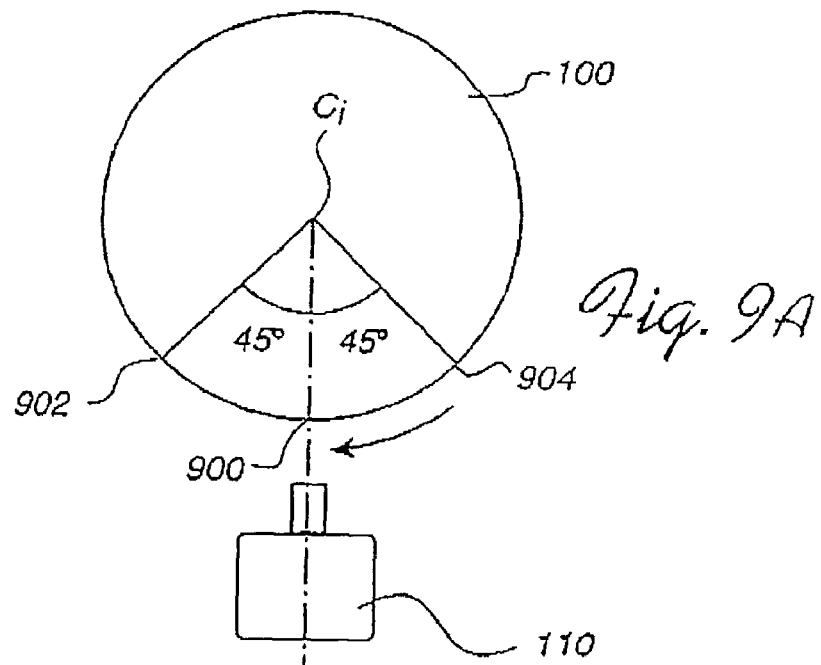
FIG. 9A illustrates a set of patch tracking limits.
Figure 9B:
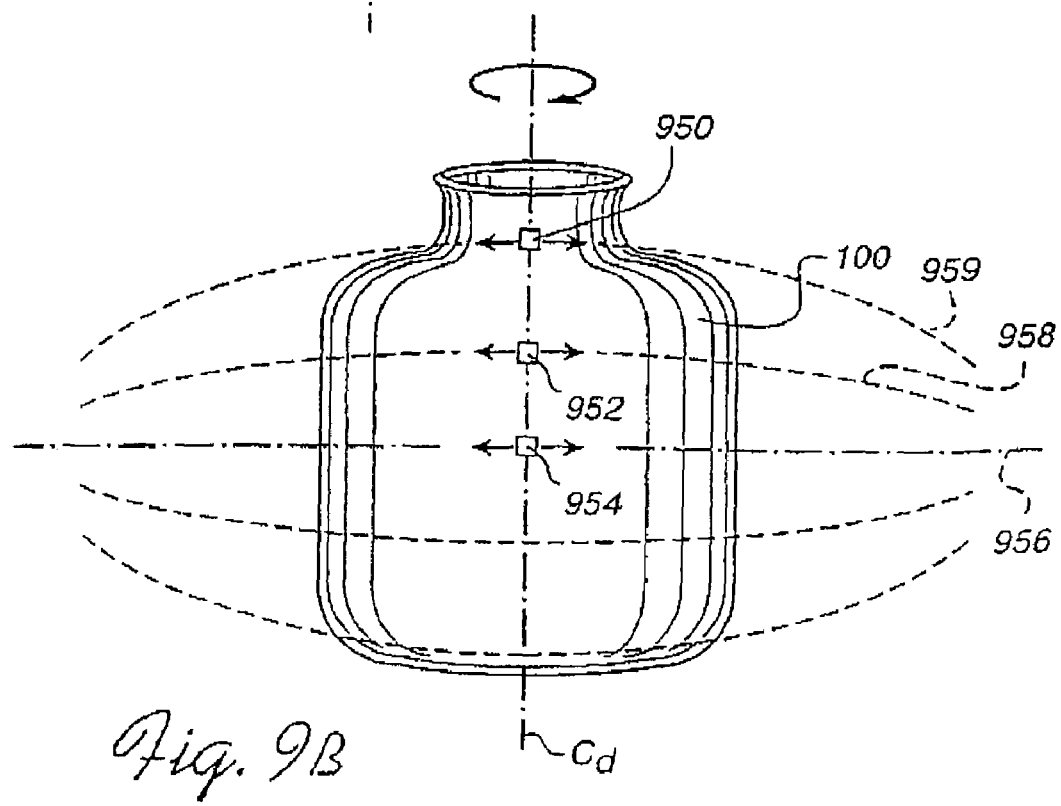
FIG. 9B illustrates the motion of trackable patches in different images with different angular displacements.
Figure 9:
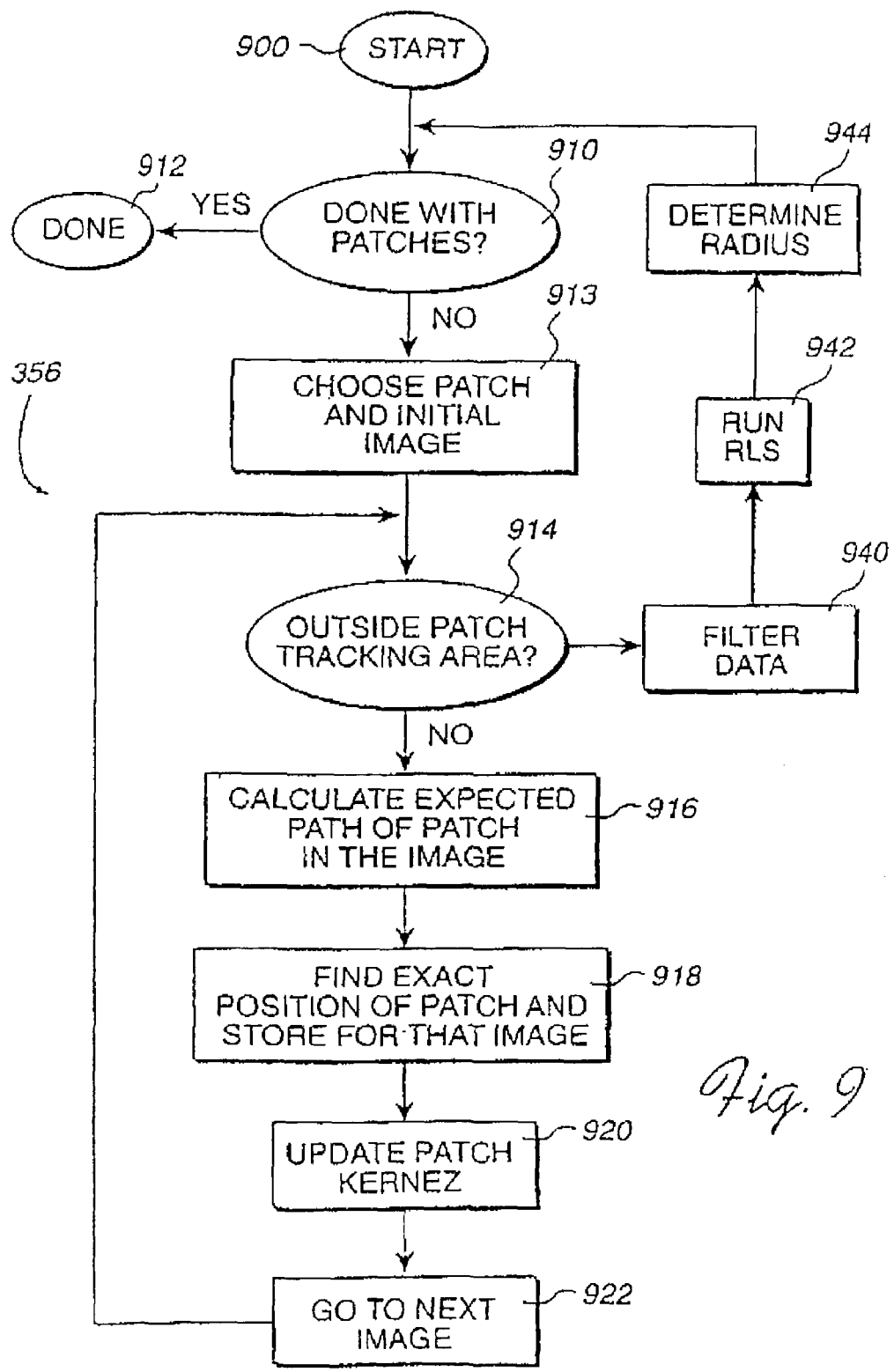
FIG. 9 is a flow diagram illustrating a process for determining the radius of the location of patches on the surface of the object as the object is rotated.

FIG. 9 illustrates the process 356 of FIG. 3 implemented to determine the radius of the location of patches on the surface of the object as the object is rotating. As noted before, a set of two dimensional images of the object are acquired as the object rotates. These images include surface features of the object located in a two-dimensional space and it is desired to derive the three-dimensional location of the features from the two-dimensional information in the images. Features which are likely to be trackable are designated as trackable patches.

A three dimensional surface is derived by locating each of the patches. This is done by tracking the patch across a number of views which represent angularly rotated images of the object. As the object is rotated (or virtually rotated if multiple detectors or a movable detector are used—whenever the object is described as being, rotated, it should be understood that virtual rotation is also included), features which are located a longer distance from the axis of rotation move a greater distance than features which are located a shorter distance from the axis of rotation. A radius from the axis of rotation of the object is derived for each trackable patch which will account for the movement of the trackable patch in the different images.

The process starts at 900. Step 910 determines whether the processor is finished with all patches. If the processor is finished with all patches, then control is transferred to step 912 and the process ends. If more patches remain to be processed, then control is transferred to step 913 and a patch is chosen, together with an initial image in which the patch is found. In step 914, the processor checks whether the patch lies outside of the tracking area within the image. If the patch is not outside the tracking limit, then the processor calculates the expected path of the patch in the image in step 916. If the image is the initial image to be processed, then the expected path will simply be the initial location of the patch in that image.

Next, in step 918, the processor finds the exact position of the patch in the image and stores that position for that image. In step 920, the processor updates the patch kernel. The reason for updating the patch kernel is that the patch will change as it moves across the image from the center towards the tracking limit. The tracking limit defines the area of the image in which patches will be tracked. This area is bounded in one embodiment across a 90 degree range. Although the tracking limit is set so that features within the limit remain relatively constant, it is possible near the edges of limit that the image of the patch will change more and more rapidly with angular displacement. The changing of the image of the patch makes it difficult to track the patch and increases the possibility of error.

Although within the region over which the patch is tracked, the patch may change considerably from the center of the region to the edge of the region, it is fortunate that, in many cases, the patch will change in a relatively continuous manner. Therefore, although the patch when viewed at the edge of the patch tracking region will appear very different than the patch when viewed at the center of the patch tracking region, the patches viewed in areas of the patch tracking region which are close to each other will be similar. To take advantage of this, the kernel used to search for the patch is changed with each successive image so that the patch searched for in each image is actually the patch which was found in the last image, not the initial patch which was defined in the center image. This makes it much easier to correlate the patch and to successfully track the patch.

Once the patch kernel is updated in step 920, the processor obtains the next image in step 922 and control is transferred back to step 914. When step 914 determines that the image limit has been reached, control is transferred to step 940. In step 940, the data is filtered or smoothed. Filtering and smoothing consists of applying known standard statistical and filtering techniques for cleaning up the data and perhaps rejecting bad data points. The data consists of the positions determined across a plurality of images for each patch. This data is associated with the color pixel information for each patch. In step 942, a recursive least square ("RLS") algorithm is run to fit the points to a curve. In step 944, the radius from the axis of rotation of the object to the surface of the object at the trackable patch is determined which will account for the motion of the trackable path across the images. Control is then transferred to step 910 which proceeds to the next patch or, if all patches have been processed, control is transferred to step 912 and the process ends.

At the completion of the process 356, three-dimensional surface information about the object has been obtained. That three-dimensional surface information is integrally linked to color data because the vector color data of the trackable patch was used to find the patch in each successive image so that the motion of the patch could be determined as the object rotated in different images. The radius of the surface portion containing the trackable patch combined with the two-dimensional pixel information obtained from the optical detector is then be transformed to provide a three-dimensional representation of the point in any desired coordinate system.

FIG. 9A illustrates a set of patch tracking limits as used by step 914 of FIG. 9. Detector 110 views object 100 straight-on at point 900 on the surface of object 100, i.e. along the centerline C.sub.i of the object. As noted above, surface features and trackable patches are viewed with the least amount of distortion at this head-on angle. As the trackable patch is rotated away from point 900, it appears to detector 110 to change shape and becomes distorted. In one embodiment, the judgment is made that it is not worthwhile to attempt to track trackable patches beyond point 902 and point 904, which are located at a 45 degree angular limit from point 900. The tracking limit in each image will be a vertical line corresponding to this angle. In other embodiments, other limits are chosen. Limits can also be learned by the system or determined based on the nature of the data so that no predetermined limits need to be set.

FIG. 9B illustrates the motion of trackable patches across different images with different angular displacements as calculated in step 916 of FIG. 9. Object 100 in this image is a symmetrically shaped vase so that the silhouette of object 100 remains constant but features on the surface of object 100 move as object 100 is rotated. Object 100 is shown with a trackable patch 950, a trackable patch 952 and a trackable patch 954. Trackable patch 954 is shown located at the exact intersection of the horizontal and vertical center lines of the detector view. When an angularly displaced image of object 100 is analyzed to find trackable patch 954, it is not necessary to search the entire image for the trackable patch in a random manner. Trackable patch 954 is expected to move along a line 956 and so the search for trackable patch 954 in a successive image of object 100 should be executed along line 956. Note that line 956 is straight because trackable patch 954 is located at the center point of the detector view in the first image. Similarly, trackable patch 952 is expected to follow a line 958 in images in which trackable patch 952 is angularly displaced, and a line 959 is the path which trackable patch 950 is expected to follow in angularly displaced images. Line 958 is curved, unlike straight line 956, because line 958 does not pass through the center C.sub.d of the detector view. Features not located in the center are expected to follow epipolar trajectories as is known to those skilled in the art. Line 959 is even more curved than line 958 because line 959 is further from the center of the detector view than line 958. Thus, it is possible to quickly locate the trackable patches in angularly displaced images because the expected path of the trackable patch is known from the epipolar trajectories as object 100 rotates.

The distance the trackable patch moves along its expected path for a given angular displacement, or the speed of movement of each trackable patch as the object rotates, is not known. The change in position will vary with the radial distance of the trackable patch from the axis of rotation of the object. This is how the radius from the axis of rotation of the object is determined.

Figure 9C:
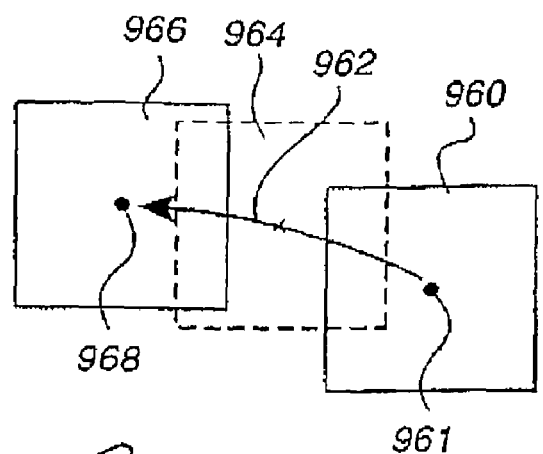
FIG. 9C illustrates the determination of an exact position of the patch in an image.

FIG. 9C illustrates the determination of an exact position of the patch in an image as determined by step 918 of FIG. 9. Trackable patch 960 was observed in a former image and its location is defined by its center point 961. The expected path 962 of center point 961 is known. The processor searches for a good correlation of trackable patch 960 with the image data for patches along expected path 962. Patch 964, represented by a dashed line, does not present a good a correlation as patch 966, which is represented by a solid line. Patch 966 is determined to be the patch and the location of the trackable patch in the new image is determined to be point 968 which represents the location of patch 966.

In this example, the center point of the patch is used to represent the location of the entire patch. This approach works as long as the patch is small. In other embodiments, multiple points are defined for a patch or a weighted average point which is based on the colors of the pixels which make up the patch is defined for the patch. In the illustrated embodiment, the location of the patch in the different images and the motion of the patch in the different images which are angularly displaced is represented by the motion of the center point 961 which represents the center of trackable patch 960 to point 968 which represents the center of the angularly displaced patch 966.

Figure 9D:
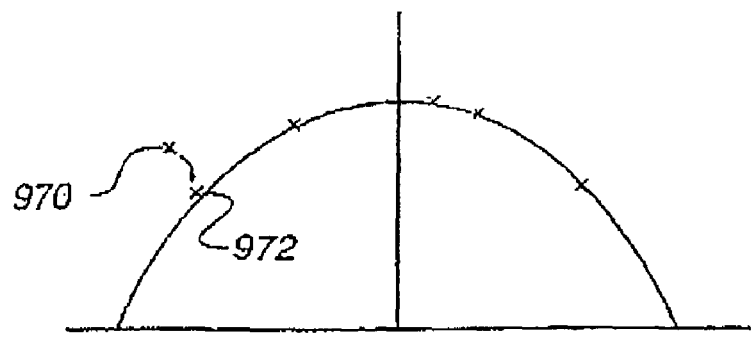
FIG. 9D is a graph which illustrates the filtering of raw data points.

FIG. 9D illustrates the filtering of the raw data points as performed in step 940 of FIG. 9. Point 970 is shown as being inaccurately derived because it is located away from the expected curve. After the filtering process, point 970 has been moved to point 972 which lies in the expected path. A number of standard filtering techniques can be used. The frequency of the rotation of the object is known and all surface feature motion should occur at a spatial frequency corresponding to that frequency. In one embodiment, a brick wall filter is used to filter the data to remove motion occurring at other frequencies.

In embodiments in which the object is not rotated at a constant frequency, or where views of the object are obtained without rotating the object, (for example, by using multiple cameras) then the spatial frequency of the occurrence of features in images will not correspond to a frequency of rotation of the object. In such embodiments, the raw data is filtered using a modified Z-transform method. Modified Z-transform methods are used to filter data when the displacement is non-uniform.

Figure 9E:
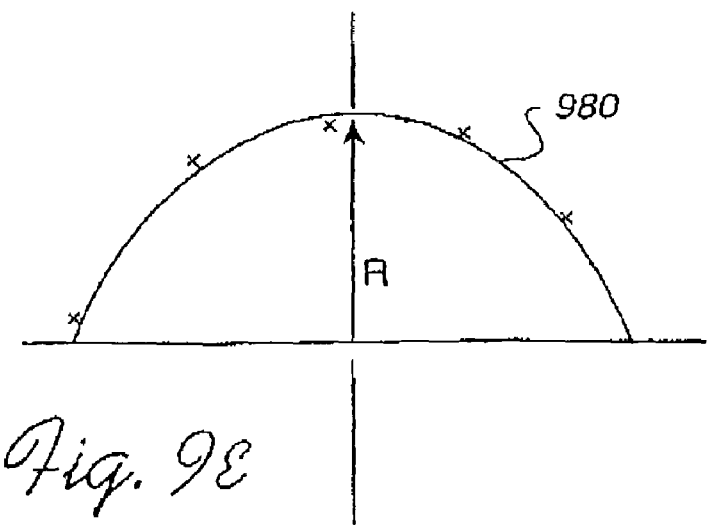
FIG. 9E is a graph which illustrates how the radius is determined from the points representing the path of the trackable patch across angularly displaced images.

FIG. 9E illustrates how the radius is determined from the points representing the path of the trackable patch across angularly displaced images and corresponds to steps 940 and 942 of FIG. 9. FIG. 9E is a plot of curve 980 which represents the first derivative of the distance, or the speed of the patch as it is angularly displaced from the center of the image versus the angular displacement of the patch from the center. When the angular displacement is zero, the displacement of the trackable patch is zero and its linear speed is a maximum value. As the angular displacement increases, the speed will change according to the cosine of the angle of displacement.

The radial distance, R, of the patch from the axis of rotation of the object can be determined from a graph of the speed of the patch as shown on curve 980. Note that the frequency of this curve is well known so the data can be filtered and the amplitude of the curve can be accurately determined. After fitting the actual rate of displacement of the trackable patch to the cosine curve, the amplitude of the cosine curve is determined. The radius of the trackable patch is derived from the amplitude. Other processing methods are used in different embodiments to derive the radius. In one embodiment, the displacement of the patch, not the velocity is fit to a sine curve. An embodiment can use any processing method available to derive a radius which accounts for the patch motion.

Figure 10:
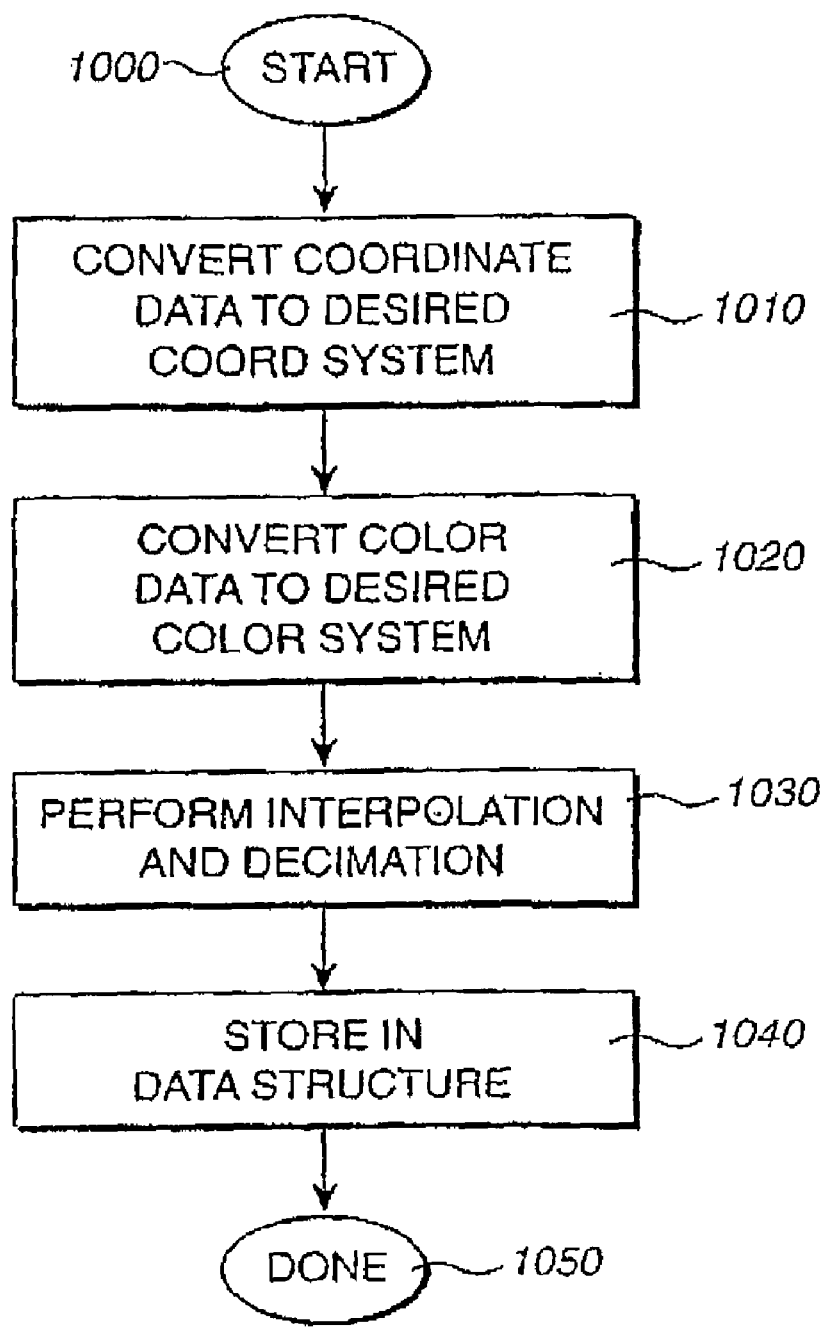
FIG. 10 is a flow diagram illustrating the post processing that occurs once the radius of the trackable patch is known.

FIG. 10 illustrates the post processing process that can occurs once the radius of the trackable patch is known. The process begins at step 1000. In step 1010, the radial distance data for the trackable patches is combined with the two-dimensional trackable patch data from the images and converted to a desired coordinate system. In step 1020, the color data associated with the trackable patch is converted to a desired color system for storage. Step 1030 performs interpolation and decimation of the points. In one embodiment, all of the trackable patch points are interpolated so that a regular array of surface points can be defined to model the surface of the object. In step 1040, the points derived in step 1030 and the color values associated with those points in the form determined by step 1020 are stored in a data structure. The process is completed at 105.

In this process, it is especially important to note that no matching of color data with three-dimensional position data is ever required. The color data for the trackable patches is already associated with the trackable patches which define the surface points of the object, and, in fact was used as an aid in calculating the three dimensional locations of those points. When the trackable patch points are decimated and interpolated, the color values are likewise interpolated. No misregistration of color occurs because the color information is already associated with the patches whose locations are determined to model the surface of the object.

In an alternative embodiment of the invention, a pattern is placed on the object to enable or enhance the identification of trackable patches and the trackability of surface regions. This embodiment is particularly useful for capturing 3D images of objects that have substantial uniformity in their surface texture and color values, such as a bowling pin.

According to this embodiment, the patch image capture, patch/kernel identification, patch kernel tracking, radial distance determination, and post processing up to step 1010 in FIG. 10 is performed on the object with the pattern just as described above. During image capture, however, two sets of 2D image data are captured. One set of image data is unpatterned or "normal" color data and the other overlying set of 2D image data is data from the object with the projected pattern on it.

Once the two sets of data are captured, patterned data is used for all of the tracking procedures described above for regions of the object that are highly uniform without the pattern. Alternatively, patterned data can be used for the whole object.

When tracking and computation of radial distance data for trackable patches is known, then, in step 1010 and/or 1020, the unpatterned color data that was initially associated with each trackable patch is combined with the radial distance data and is stored in the 3D image file. Once patch tracking is complete, the patterned data can be discarded. Note that in this embodiment, complex "matching" or "mapping" of color data with three-dimensional position data is not required. This is because the unpatterned color data is always associated with the trackable patches after 2D-image capture, even though the unpatterned data is not used in the tracking process.

It is not necessary that the geometry of pattern be known, and in fact a random but fixed pattern can be used. A preferred pattern will have high-contrast detail to allow for easy tracking of the patterned object. The size of the detail features is preferable determined with reference to the amount of surface radial position detail that the system is attempting to carry. Detail features will preferable large enough so that at least 3–30 pixels in a capture device fall within the same detail area, but not so large that substantial regions of the object have the same color values applied to them. The pattern is designed to produce varying color values (values such as hue, saturation or intensity) over the surface of the object and these varying values then enable or enhance the trackability of a region or the surface over N degrees of rotation. Examples of patterns that could be used for operation of the invention include a random, multicolored paint-splatter pattern or a complex multicolor paisley pattern However, according to a further embodiment of the invention, a pattern of known geometry (such as stripes or a checkerboard) can be used. In this case, an analysis of the deformation of that geometry over the object surface, using known techniques, can be integrated into the steps described above to provide additionally data about the topology and surface normal of the patch.

How the pattern is applied to the object does not change the operation of the invention as just described. In fact, a pattern according to the invention could be applied to the object with a physical fixed coloring substance, such as random multicolored paint splatters.

As a practical matter, however, a pattern is most easily applied using a light projection. Such a light pattern may created with a patterned colored slide or gel placed before the light source or by any other means that can project light pattern onto an object that is fixed relative to the object. The pattern can be created by placing one or more slides in front of the light sources used to illuminate the object for capturing the unpatterned image, or separate light sources can be used to create the pattern. The pattern as it falls on the image may be projected by one light source, or it may be a composite pattern of projections from several light sources.

An important characteristic of the pattern, in one embodiment, is that the pattern remains essentially fixed relative to the object's surface. If the object is rotated for image capture, the pattern must be rotated exactly with the object so that a point on the pattern always overlays the same point on the object. This same result can be accomplished by keeping the object and pattern sources fixed and using a rotating capture device or using multiple capture devices.

This technique of creating contrasting values upon the surface with a pattern may or may not be applied globally, as some regions of the object under normal illumination may be sufficiently trackability without the assistance of applied patterns. In such case, the projected pattern tracking assisting values will only be employed in regions where it is necessary to accurately track patches. This hierarchical default scheme can also be applied as multiple light sources illuminate the object to produce contrasting values in different regions that overlap. In an instance where multiple light sources each create trackable patches will be chosen or eliminated to produce the greatest overall density of trackable patches within such a regional condition.

In a further embodiment, contrasting lighting of known structures can be applied in an additional step. The lighting can be synchronized to a moving object or be projected from a static source while the object moves (rotates) or from a moving (rotational) source while the object is still. For instance, if known lines of known width and spacing from a light source that rotates with the camera as the object is still, observation of the pattern on the surface can be utilized to predict the deformation of the pattern. Then the derived information can be integrated into the invention's procedure to produce additional information about the estimation of surface topology and surface normals of a given patch or region of patches.

In a further alternative embodiment, a camera with control and software according to the invention, can be pointed outward as it is moving about an axis to capture a 3D image of a room or environment. The camera can also be pointed inward but looking beyond the radial distance of the cameras. In this embodiment, patches are identified and tracked in the same manner as described above. The alternative embodiment of tracking patches using patterns can also be used in this embodiment and may be especially helpful in tracking large, uniform areas, such as blank walls.

Continuation

The following descriptions are added to the above referenced related applications and contains both repeated descriptions of that in the related applications as well as new material; in any case being referred to as a continuation.

This continuation describes the core processes and elements of a system architecture which can serve as the infrastructure for facilitating the integration of various techniques and equipment utilized for 3D object surface feature capture into a singular operational platform. Prior art examples of such 3D object surface feature capture processes and equipment are actually embodied in a diverse, and often incompatible, or at least difficult to integrate array of systems and functional operations. This continuation provides a unique solution to this problem, in the form of a universal infrastructure enabling a heretofore unattainable level of system integration incorporating a diverse range of 3D object surface feature capture systems and operations. This universal infrastructure incorporates the ability to utilize any or all variations of active and structured lighting, such as interferometric patterning, spectral property analysis, and other related processes which have previously been isolated as separate, discrete, and often incompatible procedures. The advantages of applying this unique infrastructure to such operations and equipment is that it enables the automation of color alignment, measurements of surface properties such as specularity and reflectance, and other key data sets that allow for the simultaneous capture of such surface data sets as a contiguous, unified process. This is a major advance in the enterprise 3D object surface data capture operations where high accuracy, and high throughput capacity are desired.

Described here is a method of determining and exploiting the relationship between the camera and the individual 3D surface elements that compose the surface of an object. Related image data and data relating to camera position and orientation, lighting and the 3D surface of an object are determined and processed using an organized processing structure that is integrated with specific physical scanning set ups to create efficient and accurate scans of 3D objects. The fundamental processing infrastructure is based on developing individual viewing histories of identifiable 3D surface elements. The related physical scanning set ups are based on specific architectural strategies that organize the layout of calibration objects that are used in the scanning process.

The position and orientation data of the camera will be referred to as the camera geometry. The surface orientation of a local surface patch will be referred to as the surface normal vector. The relationship between the camera geometry and the surface normal vector of local patch will be referred to as the viewing geometry. This continuation describes how camera image data and related camera and viewing geometry data are obtained using various physical set ups. This continuation then describes how the viewing history archives the aforementioned data to streamline the process of producing successful scans of three-dimensional color objects.

This continuation describes various embodiments that use strategically configured calibration objects to efficiently and accurately determine camera geometry (the location and orientation of a camera relative to a reference frame). The set of 3D points corresponding to the features of the calibration object on the planar object support may be used as a reference frame. Visual components of the calibration objects generally contain high textural contrast to enhance the efficiency and accuracy of calibration procedures (such as checkerboard patterns). Imagery may be integrated with the design and or layout of calibration patterns to introduce image variation to permit the identification of each 3D-calibration point. For instance, local uniqueness can be established by introducing variation of texture or color within or adjacent to a checkerboard pattern. This identification of each point may also be facilitated by the introduction of geometric variation.

This continuation describes various embodiments that incorporate the use of projected contrasting lighting, including projection schemes incorporated by active range finding techniques. The active range finding techniques often produce separate sets of range data. The separate sets of range data need to be aligned. The alignment of the separate sets of range data may be performed using numerous known methods. Known methods include the identification and tracking of features and tracking scanner position [Faugeras 1986, Stein 1992], surface signatures [Johnson 1997] using the axis of rotation [Dorai 1997], using point correspondence matching [Chen 1998, Chen 1999], or user input by registering the 3D positions of identifiable 3D points that are common to multiple scans. The invention uses the precisely known location of identifiable 3D points that are located on the object support platform on or adjacent to the calibration objects to align the separate sets of range data to produce a continuous 3D point cloud describing the surface of a scanned object This continuation also describes methods where the geometric extraction process may be decoupled from the tracking of the image of a surface patch. The decoupling permits the use of viewing geometry history and calibration strategies as described and can provide an infrastructure by which an array of active 3D shape extraction (also known as active range finding) technologies may used to produce precise and efficient determination, selection and alignment of color data with individual 3D surface elements. The decoupling also permits the precise and efficient determination, selection and alignment of view dependent color and surface property data with individual 3D surface elements.

Imagery from cameras is registered to the surface of objects in this system by using a common reference coordinate system for camera calibration objects, the calibrated locations of the cameras, and the 3D measurements of target object surface geometry including shape and surface normals.

The location and orientation of a camera with respect to a target object may be determined through the use of calibration objects placed at known locations with respect to each other. This determination and recording of the camera position and orientation can contribute to the providing a basis by which optimal image data may be selected for color mapping. Furthermore camera geometry data may be used to determine the surface reflectivity and other surface attributes/properties of the surface of the target object.

The camera trajectory may be determined by placing calibration objects at known or determinable locations relative to each other. The calibration objects produce imagery that contains identifiable features (e.g. corners within checkerboard patterns) that are processed to determine camera orientation and position. As the camera is moved, various individual calibration objects may be obscured by the target object. In order to ensure that the camera position and orientation can be determined at all positions of a trajectory, the calibration objects are positioned in such a manner that some number of calibration features will be visible to the camera at all camera locations during the acquisition of images of the target object.

If multiple objects are imaged by the camera at each location, the location and orientation of the camera relative to the objects can be determined [Introductory techniques for 3-D computer vision. E. Trucco, A. Verri. Prentice-Hall, 1998]. Since the calibration objects are placed at known and fixed locations with respect to each other, determination of the camera location and orientation allows determination of the location and orientation of the camera with respect to the target object. The orientation of the camera may be expressed as a "line of sight" vector.

If the object shape is unknown, measurement of the camera locations allows well-known triangulation techniques [Error propagation in two-sensor 3D position estimation, J. N. Sanders-Reed, Optical Engineering, 40 (4)] to be employed to determine the 3D location of any arbitrary point on the surface of the object. Active projection of light can be used to generate a fine grid of identifiable points on the surface of objects which may not have naturally identifiable points. Alternatively, numerous active range finding techniques may be employed to determine surface geometry coordinates of objects that may or may not have any naturally identifiable points.

Once the object shape is known, whether measured as described, or known a priori through other means, the surface representation of the object may be divided into numerous 3D surface elements each of which corresponds to an actual surface patch on the scanned object. A surface element is defined as the 3D representation digital of the geometry of an actual surface on a scanned object. Independent measurements of color, surface reflectivity and other surface properties are obtained by analyzing image, 3D and camera data relating to a 3D surface element. Surface orientation data of a 3D surface element may be estimated and recorded with 3D coordinate data of said 3D surface element. For each 3D surface element, the surface orientation (e.g. the surface normal vector) is compared with the Line Of Sight vector from each camera location. The camera location giving the smallest difference between the two orientation vectors often provides the clearest image of the surface patch (unless another portion of the object obscures the view or if shadows or reflections contaminate the image data).

Hi fidelity registration of color and surface properties with 3D range data requires accurate determination of camera parameters.

Image based methods of determining the camera positions are usually inexpensive and mechanically flexible. They may be combined with mechanical camera systems to enhance functionality.

The location and orientation of a camera with respect to a target object may be determined using calibration objects placed at known locations with respect to each other. The calibration objects provide points in space that are used for calibration purposes. This determination of the camera location can be used to select the best imagery to determine the surface reflectivity of each surface patch of the target object. One calibration method originated by Tsai is based in the "pinhole camera" model and uses a calibration object of precisely known geometry and to solve for camera parameters and a radial distortion coefficient given the image projections of several points on the calibration object. See R. Y. Tsai, "A versatile camera calibration technique for high-accuracy 3D machine vision metrology using off-the-shelf cameras and lenses," IEEE Trans. Robotics and Automation, vol. 3, no. 4, pp. 323–344, 1987.

We will consider a single line path connecting each point on a camera image plane, through the center of the lens, to the point on some object that is visible at that point in the image, as shown in FIG. 11. FIG. 11 shows that an image 12 in a camera 13 is flipped upside down and backwards as it is projected onto the image plane. The projection proceeds from the object 14, along rays 15, through the "Pinhole" or optical center of the lens system 16, to the image plane 12. In the geometry of computer graphics calculations, it is customary to simplify further by visualizing the image plane as being in front of the "eye" lens center at a given distance. This avoids the confusion of flipping the image. It could also correspond to an outward projection of points on an image, as shown in FIG. 12, from the optical center 21 of a projection light source, through an image transparency 22, and into light rays 23 that intersect an object 24 at single points.

The invention may use a single calibration object. The preferred embodiment uses a ring of calibration objects. Numerous calibration techniques may be applied within the framework of the invention. Examples of a range of techniques may be seen in: Camera Calibration With one-dimensional Objects, Zhengyou Zhang, December 2001. Other techniques as shown in M. Pollefeys, R. Koch, and L. V. Gool, "Self-calibration and metric reconstruction in spite of varying unknown internal camera parameters," in Proc. Sixth Int. Conf. on Computer Vision, pp. 90–91, 1998.

After locating the feature points of the calibration objects visible in a particular image, and pairing the reference-space and image-space coordinates or each point, the camera calibration function determines the reference-space coordinates of the camera center, direction of view, and any rotation around the view vector (the extrinsic camera parameters.) This is standard practice (ref. Intel Open Source Computer Vision Library), and also determines the intrinsic camera parameters including the distortion due to wide-angle lens curvature that must be compensated.

A single calibration cube may not be the optimal solution as it may occlude or be occluded by an object within the field of view. A preferred embodiment incorporates the use of a calibration ring. Calibration of precisely known geometry objects are configured on a platform at well-known positions relative to a reference coordinate system, which can be placed anywhere desired. For example, one can choose the reference coordinate system origin (zero) point to be at the center of the object platform, with perpendicular one-unit-long X and Y coordinate direction vectors in the plane of the platform and the Z coordinate direction pointing upwards. The calibration object may be of zero dimensions (points), one dimension (lines), two dimensions (checkerboard patterns) and three dimensions (such as, a cone). Two-dimensional patterns (i.e. patterns of known geometry such as checkerboard patterns and grids) may be substituted for or integrated with the 3D objects.

The calibration ring is designed to act as continuous calibration imagery for scanning object(s) inside and outside the camera motion path. The 3D coordinates of the feature points are useful in aligning multiple sets of 3D data. A calibration object may consist of points, lines, planes and various 3D shapes. The object may be with or without texture or color. Generally, the speed and accuracy of calibration procedures may be enhanced by knowing the precise measurements of object shape and surface pattern. Additional efficiency and accuracy may be achieved where the calibration image source is composed of multiple planes. The exact knowledge of a calibration object's geometry in 3D space or of the spatial relationship between multiple calibration objects also increases accuracy.

The integration of 3D calibration objects with the calibration ring provides the capacity to determine the position and incident angel of light sources. Embodiments that involve surface property extraction and projected active lighting may benefit greatly from this method.

The calibration objects are may be precisely configured with respect to their position and orientation. Further the geometry of their visible features may be precisely known. Thus, for example, the exact object-space coordinates of each corner of each calibration checkerboard pattern square are known as measurements relative to the reference coordinate system. Camera calibration depends on the correspondence between the reference coordinates of the visible features of the calibration objects, and the image-space coordinates from the camera views of those same features.

Furthermore, to aid the identification of calibration points related to the calibration objects imagery nay be introduced to create local variation of texture (for example color or random patterns).

Many approaches may be used to determine this camera information in the process, one of which is detailed here. In FIG. 13 a ring of eight calibration objects 31 is shown around the support base 32 on which an object to be scanned 33 is positioned. The calibration objects are small three-by-three checkerboard patterns, each uniquely identified by a colored border to remove ambiguity. The diagonal position of the eight calibration objects is explained by the fact that they are actually arranged at the outer corners of two large checkerboard squares 41 and 42, as shown in FIG. 14.

Each image has its own image-space coordinate system relative to the camera position as the image was taken. For convenience, we place the image origin in the center of each image plane, with X to the right and Y upward within the image and Z perpendicular to the image. The optical center of the camera (the center of the lens aperture, or the viewpoint "pinhole" in a simplified camera model) is then somewhere on the image-space Z-axis.

Practices vary as to whether the image-space positive Z direction points toward the camera or toward the object, and what the Z coordinates of the camera and image are. Any convenient choice may be made, as long as it is used consistently. Here the camera viewpoint is defined to be at $Z=-1$ in camera coordinates, and the image plane to be at $Z=0$. The image-space Z coordinates of the platform and object(s) to be reconstructed will then always be positive, but of course different relative to each camera location.

Tracked surface elements are the points on the surface of the object to be reconstructed that can be identified in multiple views. The natural texture of the object may lead itself to fine-granularity surface tracking of points on the surface. Otherwise, a texture must be applied, either by projecting light patterns onto the object, or by physical means such as applying a spray of paint splatters.

The present invention provides an infrastructure by which an array of active 3D shape extraction, also known as active range finding, technologies may use the procedure of the invention to incorporate precise color alignment and surface property alignment and thus improve their operative capacity and breadth of applications. The use of the calibration ring may provide the infrastructure to align the separate sets of range data. If the object shape is unknown, measurement of the camera locations allows well-known triangulation techniques to be employed to determine the 3D location of any arbitrary point on the surface of the object. Active range finding techniques can be used as to generate a fine grid of unique points on the surface of objects, which may not have naturally identifiable points.

The process of active range finding is inherently dependent on utilizing an illumination source, which is dynamically incorporated into the operation of the range finding system. In essence, even though there are a variety of implementations of active range finding systems which scan or measure various attributes of illuminated regions of space and surfaces within that space, they all incorporate some aspect of controlled illumination of the region being thusly measured.

Some systems, such as optical radar (LADAR) measure the actual transit time of light emitted from a laser illumination source and subsequently reflected from targeted surfaces. These types of systems are most often used to capture 3D surface data of large structures or regions of space, as might be associated with buildings, complex industrial structures, or even landscapes. Other forms of 3D surface or topographical feature data capture are often facilitated by stereoscopic triangulation, which will rely on the projection of structured light (typically in the form of a lateral plane).

The lateral plane of light, when viewed at an angle divergent from the angle of projection as it intersects the surface being illuminated readily reveals contour features of the illuminated surface. This is because any surface feature which is viewed from an angle which is not perfectly parallel to the angle of illumination will cause an apparent deformation of the "line" of light illuminating the targeted surface, which is directly proportional to the amount of surface depth, Other variations of this theme also utilize projected patterns of dots, line grids and graticules, depending on the particular requirements of the system resolution, topographical region capture time (an array of lines or dots can capture an entire region simultaneously, as opposed to a linear line scan process), types of surfaces being measured, the presence of depth discontinuities (certain active lighting configurations will produce incorrect measurements in the presence of non-smooth surfaces), and other system requirement variations.

Additionally, other forms of pattern projection, such as Moire patterns, and related interferometric methods, have been utilized to accommodate topographical feature extraction from complex surfaces. Interferometric surface analysis in this context usually will consist of the stereoscopic projection of a pair of known patterns upon a target surface.

When these projected patterns encounter a less than perfectly flat surface, an interference pattern is generated which is readily recognizable.

Stereoscopic triangulation is used as a method of patterned light projection for extracting 3D topographical feature data from a complex 3D surface. Relative depth perception from the reference plane of projection is a function of the baseline separation distance in proportion to the focal distance of the targeted surface. Stereoscopic visualization techniques for 3D panoramic scene analysis have long been utilized in machine vision and robotics applications. In the context of range finding analysis for 3D topographical surface data capture, this same general concept can also be applied to the projection of structured light, and the analysis of interferometric patterns rendered upon the targeted surfaces being thusly illuminated.

Stereoscopic triangulation provides a geometric framework for establishing relative depth acuity (Z axis domain data) from the projection plane of structured light. Moire or related interferometric patterning is observable on the targeted surface as a function of the surface deformation from planar perfection, where the deviation of planar surface geometry on the illuminated surface is directly correlated with the interferometric pattern geometry of the resulting pattern sets observed on the illuminated surface. Variations in resolution, in regards to the degree of interferometric pattern anomalies correlated to actual Z domain distances (relative height features) is accommodated by adjustment of the ratio between the focal distance of the projected patterned light sources, and the distance to the targeted surfaces.

Angle of divergence from a stereoscopic source of patterned light is represented as the ratio between separation distance at the focal plane of projection and the distance to the targeted surface, from which Z axis domain data is extrapolated from the interferometric patterns observed at the illuminated surface.

A time of flight laser range finder, in which the reflection time between the initial source of illumination, and the light reflected back to a detector, is correlated to the actual distance from the illumination source. This provides a mechanism for illuminating a targeted surface with a sequential series of laser light pulses, each one of which is projected to a specific XY coordinate on the targeted surface area, and from which relative Z axis (distance) values are extrapolated by variations in the measured photonic reflection times.

Examples of structured light illumination of a targeted surface include utilizing projection of a plane of light to reveal topographical features as a function of lateral deformation of apparent "line" of illumination correlating to relative height (Z axis domain) of features on the illuminated surface.

Triangulation of reconstructed object points uses multiple calibrated images. Tracked points on the surface of an object to be reconstructed are the centers of tracked surface elements that were identified in many views. Each visible point in an image plane is on a line that passes through the camera viewpoint and the image point, and extends to the object. Two or more of these view lines, transformed into reference coordinates, intersect to determine the three-dimensional reference-space coordinates of a surface point. FIG. 15 shows just two of what might be a large number of these digital images 51 and 52, positioned in three-dimensional space with their respective cameras 53 and 54. The camera location parameters were previously determined, above. A particular surface element appears in both views 51 and 52.

As shown in FIG. 15, two lines 55 and 57 are projected outward from the pinhole camera centers 53 and 54, and through the surface patch centers in the respective images 51 and 52, making a triangle to the triangulated point 58. The surface normal at point 58 can be determined by known methods. Affine tracking across multiple views can also be employed to determine the surface normal at the point 58.

A shape representation of the surface of the reconstructed object is constructed from the triangulated points. Triangulation first produces a point cloud representation that lacks most of the attributes of a surface shape representation. Geometric algorithms may be used to translate the point cloud data into other surface element representations. The simplest one is to use a Voronoi adjacency diagram to produce a Delaunay triangulation that has fine-granularity triangular facets joining adjacent triples of surface points. Other algorithms produce coarser optimal triangulations that satisfy approximation or compression criteria, or curved surface representations such as subdivision surfaces or piecewise polynomial B-spline surfaces.

Profilometry is another use of patterned light projection. In profilometry, patterned light consisting of bright and dark bands is projected onto the object. As shown in FIG. 16, the planar edges of the projected light bands 63, when cast on the object 64, are seen in two camera views at different angles 61 and 62 and reveal a curve whose position determines a curve on the surface of the object by triangulation. If the light bands are vertical in relation to the object platform, it is sufficient to locate the straight-line shadow that the edge of the light band casts on the object platform. This uniquely determines the plane of the light band edge in reference coordinates.

Surface coloration of the reconstructed object consists of texture map images associated with each surface element. The surface shape representation of the reconstructed object is rendered into a Z-buffer image from the calibrated point of view of each particular camera image, and object number tags are assigned at each visible pixel point. Each surface element is projected into an image plane grid that corresponds to the pixel dot centers locations of a camera image. As shown in FIG. 17, the projection goes along the view lines 71, from the surface element centers 72 and 73, and through the image 74 and 75 and the camera pinhole center 76. Two points 72 and 73 are shown that map to the same point in the image, one nearer 72 and the other one farther away 73 and hidden by the first 72. The image-space coordinate system 77 appears with both the edge-on 74 and rotated view 75 of the image. Depth is measured along the optical axis 78 to the perpendicular projections 79 and 80 of the two points 72 and 73 onto the axis 78.

Pixel quality criteria may be used to select the best pixel data, such as frontalness where the surface normal points closely enough toward the camera to avoid edge-on views, or with a reflective object in a specular lighting environment. The surface normal may be used to avoid highlight areas which will obscure the surface coloration. Also consider the immediate neighborhood of a Z-buffer image point may be considered to decide whether a point is close to being obscured, and so its visible color would be "contaminated" by another surface.

Using methods previously described, the viewing history is developed for each 3D surface element and used to align and select image data to each 3D surface element.

The visibility computation and matrix (as described below) can be implemented in this embodiment to prevent contaminated 3D surface element views from being mapped to the surface.

Frontalness settings may be used to automatically select the image data of the patch within a viewing history that is likely to be most optimal for mapping to a corresponding 3D surface element.

In one embodiment infrared lighting is projected for geometric extraction purposes and thus allow for scans to be performed under a single lighting set-up, using infrared for shape determination and visible light for color and reflectance measurement.

Pixel projection transforms individual selected image pixels from the image coordinates of a particular camera view to the reconstructed object surface element visible in a Z-buffer rendering. Each surface element representation has an intrinsic method of identifying locations within the surface elements. For example, triangular facets have barycentric coordinates that locate points in the plane of the triangle with respect to the vertex points and straight edges of the triangle. Tensor product curved surface representations such as B-splines have parametric coordinates that are like a curved X-Y coordinate grid on a distorted rubber sheet. The task is to put the projected pixel color into the right point of the texture map image associated with the surface element. Furthermore, pixel colors from potentially many camera views will be merged into a single texture map image. FIG. 18 shows a pixel color sample 81 being projected along a ray 82 from the Z-buffer image, to a location within a particular surface element. (The surface element boundaries 83 are shown to illustrate this point.)

Surface reflectivity measurements are like surface coloration measurements, but may require different lighting conditions. Once the surface shape has been reconstructed, possibly under patterned lighting, and the surface color under "white light" (generally ambient or diffuse lighting where multiple light sources are often used), point source or spotlighting is used for reflectivity measurements of visible surface elements. The already known surface coloration texture map is utilized. Now, the many views of the surface in different camera views is used to examine the differences in light reflected from the surface element with different pairings of the surface normal with its angles between the direction of view and the direction of the light source. These angles are the main input parameters of a BRDF (Bi-directional Reflectance Distribution Function) that represents the reflectivity of an object for image rendering purposes. Depending on the BRDF representation used, the other parameters are fit to approximate the reflectivity at each surface element point. The result is a reflectivity map image that contains the variation of reflectivity parameters across the reconstructed object surface, just as the texture map images contains the surface coloration.

Three-dimensional calibration objects are needed to calibrate the reference-coordinate space locations of incident lighting used for reflectivity and other surface property calculations, because the angle between the light direction and the surface normal must be known. One form of 3D calibration object that could be used is a cone shape with a calibration checkerboard pattern on it. FIG. 19 shows a set of 3D calibration cones 91, with shadow lines 92 superimposed to illustrate triangulation of a light source 93. The shadow that each well-known calibration cone casts on the platform determines a line 92 from the tip of each shadow 94, through the tip of the corresponding cone 95, to the light source 93. Triangulation, intersecting two or more cone-shadow lines 92 locates the light source 93 for this purpose.

Initially the surface geometry is represented as a point cloud. The 3D data is processed to produce a 3D surface description that is comprised of 3D surface elements. Typically, the 3D surface description is a triangulated mesh comprised of numerous triangles. The surface normal may be computed for each triangle. Numerous images are acquired and stored along with the viewing angle used during acquisition. The local image data corresponding to each 3D surface element/triangle may be computed using the reference coordinates and corresponding camera parameter data related to the acquisition of images and determination of surface geometry. The reference coordinates provided by the calibration objects and related camera geometry data are used to create a digital model of the object that corresponds to any view of the object). The local image data that corresponds to a given 3D surface element may be easily matched using precise reference data and camera geometry data common to both captured data and synthesized 3D descriptions.

For each surface element, the surface normal is computed. Data related to the plurality of images acquired from a plurality of views of each 3D surface element is recorded in a viewing history. In addition to the pairing of the surface element and the view number and image-space pixel data, the viewing history can be generated which contains the 3D coordinate data including the surface normal vector for each surface element. Multiple images and corresponding viewing geometry data per camera view are individually entered into the viewing history. Lighting geometry (the position and orientation of a projected light source relative to said surface normal vector) of one or more light sources may also be determined and integrated into the history.

Surface normals may also be determined by stereophotometry, which is also known as "shape from shading". This is most applicable to surfaces with uniform coloration and diffuse (matte) reflectivity properties, so that a Lambertian (cosine law) shading results from directed lighting. Multiple light sources are used one at a time to capture images. Typically the camera is not moved between views to facilitate image registration. The shading of each pixel indicates the angle which the surface normal inclines from the light direction. Hence, at least three images are required to uniquely determine the surface normals. Shape information can also be inferred by numerically integrating the surface normal field determined for the object, but this is problematic due to accumulating numerical error from small misestimates of the surface normal direction.

The lighting geometry and viewing geometry may be correlated with each other and observation of incident lighting can produce corresponding surface reflectance data. More samples with different lighting and viewing geometries will provide a more accurate estimate of the surface reflectance properties. Knowledge of the intensity (e.g. in Watts per unit of surface area) of the incident light and observation of the change in image intensity between the incoming and outgoing light may be used to create a more accurate reflectance mapping of the 3D surface element The viewing history may take the form of a table that includes some or all of the recorded data such that the data for each view may be cross-correlated for processing purposes. Furthermore, the table (such as set, list, matrix, array or other data structure) may be used to batch process the data relating to the entire collection of data relating to the plurality of views of a given surface element entered into the viewing history.

As previously mentioned, the surface of the object may be divided into numerous surface elements of viewing histories, which will serve to provide a structure by which the aforementioned correlations may be made to produce independent measurements of the surface reflectivity for each surface element. The process may be applied to all visible surface elements of a scanned object to produce a global reflectance mapping.

The viewing history of a given 3D surface element provides the basis to automatically select color data to be aligned to the 3D surface element. For instance, for each 3D point and each camera position, the angle may be calculated between the point's surface normal and a ray from that point to the camera's center of projection. So, if the angle is 0, the surface patch was facing the camera, and if it is pi/2 (90 degrees) then the patch was edge-on to the camera. Different settings, that is, thresholds and ranges may be set to include or exclude data to be aligned or otherwise associated with the respective 3D element as part of a representational scheme. For instance, the view directly facing the camera (that is, 0 degrees) may be desirable because that view would have the least distortion. A setting of 0 degrees or 0–5 degrees may be used to automatically select the image data to be associated with the respective 3D element. However, another viewing angle may be likely to exhibit specular reflection due to the location of the projected light, which may be undesirable. The settings may also provide a basis for selection within a weighted value system wherein the image data selected at specific settings will be more or less prominent with respect to image data selected at other settings based on the weighted values assigned to the corresponding settings. For instance images corresponding to settings of between 0–5 degrees may be given a certain weighted value because of how the frontalness of the surface affects the color image, while the angles of 20–30 degrees may be given a different weighted value because of how the angle of incident lighting affects the color image. In such cases the imagery data associated with the higher weighted values will appear more prominent in the image data to be aligned or otherwise associated with the 3D surface element as part of a representational scheme. Ultimately the 3D surface data is assigned to the respective 3D surface element.

An overlay image can be combined with the camera image to show the accuracy of the camera calibration and shape reconstruction process. The overlay image contains a sample of surface points and normals, rendered graphically from the point-of-view of a particular camera position.

Furthermore, this continuation describes the integration of viewing geometry data with data produced from the control and manipulation of the direction, intensity, frequency and numerous their properties of incident lighting (including contrasting lighting). The acquisition of surface coloration (hue, saturation and intensity) may vary depending on lighting properties, lighting geometry and camera geometry. The knowledge of the angle of incident lighting (lighting geometry) can be combined with the knowledge of the viewing geometry and used to determine the reflectivity and other surface properties of a patch. The viewing history may additionally include the angle, distance, intensities and spectral qualities describing incident lighting and the corresponding reflected lighting.

The viewing history may also include the categorization of illuminants (i.e. ambient lighting, diffuse lighting and specular lighting. If the multiple measurements of surface coloration and any of these properties are made at specific angular displacements relative camera and observed surface patch then the measurements may be said to be view dependent as the resultant acquired images change in appearance depending on the relative angular displacement between views. Furthermore if multiple measurements are made accompanied by measured or observed changes in lighting properties and/or geometry then the measurements are said to be lighting dependent.

The virtual representation of the target object contains 3D surface shape data (position and normal of each surface element), as well as associated surface property distributions including color map images and reflectivity (BRDF) function parameter images. When the virtual object is displayed from any new, synthesized view direction, the result is an automatic view-dependent selection of the best data that was integrated from the combination many camera views>of the real object. A series of data capture events, in which camera and light source angles are situationally coupled, create a viewing history data set, from which view dependant 3D object surface analysis can be readily extracted. This viewing history data set can then be compiled, back annotated and otherwise processed to develop the shape and image of an object(s) thusly captured, as a dynamic view dependent representation of said object(s). Such a view dependent representation would interactively display the scanned objects image surface properties relative to virtual lighting and camera coordinates. A view dependent representation may also be created without regard to lighting geometry and other lighting data. In such a case the image and geometry of such a view dependent representation may only interact with virtual camera coordinates. If a representation is created where said representation includes lighting properties and lighting geometry data then the representation may be defined as lighting dependent. View dependent and lighting dependent can be combined to form extremely vivid and dynamic representations. The shear volume of data that is conveyed by view dependent and lighting dependent representations call for compression and expression in the form of a mathematical function. A frequency based functional expression of the spectral and geometric content of said view and lighting dependent representations is most appropriate.

A surface patch may represent any size surface region. The surface patch relative to the camera may be as small or smaller than a pixel. Thus a 3D surface element may be of sub-pixel resolution.

The extraction of hue, intensity and saturation values of a pixel as it is related over time to changes in lighting and camera view can produce of raw data that can be expressed as a mathematical function or as a constant. The extraction of changes of hue, intensity and saturation values of a pixel over time relates to changes in lighting geometry and camera geometry.

A functional expression can express the combination angle of incidence, intensity and color of light, as well as viewing angle.

The basis for the extraction of more information to be incorporated into the reflective coefficient of that pixel. The reflective coefficient can be used to create a mapping that would create an independent functional expression of the color of that pixel as it relates to position of view.

The reflective coefficients and color values as functional expressions can then be integrated with a format; such as voxel (volumetric pixel) that allows for a hierarchical representational structure that incorporates viewing angle and distance of lighting conditions. The color values of each pixel expressed as constants shall be acquired when the relationship to sensor focal plane and surface normal is most frontal and the relationship between surface normal and lighting geometry the most consistent while also providing clear imagery.

While this invention has been described in terms of several preferred embodiments, there are alterations, permutations, and equivalents that fall within the scope of this invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. A method of forming a digital representation of a real object from a plurality of multiple images depicting a plurality of surface portions acquired at multiple viewing angles, the method comprising:
   a) computing a first representation of the object, the first representation comprising a plurality sub representations, each sub-representation corresponding to a local surface region of the object and comprising;
      i) a 3-D surface data component,
      ii) multiple image data components including color,
      iii) a multiple viewing angle data component,
   b) computing a second representation of the object, the second representation comprising a plurality of view dependent sub-representations of local surface regions of the object, each sub-representation comprising;
      i) a 3-D surface data component,
      ii) multiple view dependent image data components,
      iii) multiple local viewing angle data components,
   c) said step of computing the second representation of the object comprising compressing image data components.

2. The method of claim 1 wherein said step of computing the second representation further comprises independently processing each sub-representation by removing redundant data from the first plurality of sub-representations and selecting non-redundant data to be included in the second plurality of sub-representation.

3. The method of claim 1 wherein said step of computing the second representation further comprises developing representations for surface attributes in addition to color.

4. The method of claim 3 wherein at least one representation includes at least one viewing angle parameter.

5. The method of claims 2 wherein the representation includes at least one parameter for representing the change in surface appearance for a plurality of points of the surface of the object, the change corresponding to a change in lighting conditions.

6. The method of claim 2 wherein the redundant data is image data.

7. The method of claim 2 wherein the redundant data is three dimensional data.

8. A method for scanning a three dimensional object, the method comprising:
   a) developing a plurality of images of a three dimensional object to be scanned, said plurality of images being taken from a plurality of relative angles with respect to said object, said plurality of images depicting a plurality of surface portions of said object to be scanned; and
   b) computing a representation of said plurality of surface portions of said object from said plurality of images, the representation comprising view dependent sub-representations of local surface regions of the object, each sub-representation comprising:
      i) a 3-D surface data component,
      ii) multiple image data components,
      iii) multiple local viewing angle data components,
   c) wherein said step of computing the representation further comprises compressing the image data.

9. A method for scanning a three-dimensional object according to claim 8 wherein the multiple image data components of each sub-representation are independently compressed.

10. The method of claim 8 further comprising developing representations for surface attributes in addition to color.

11. The method of claim 8 wherein at least one sub-representation includes interpolated data.

12. The method of claims 8 wherein the representation includes at least one parameter for representing the change in surface appearance for a plurality of points of the surface of the object, the change corresponding to a change in lighting conditions.

13. The method of claims 8 wherein a combination of compression techniques are applied to the same data.

14. The method of claims 8 wherein at least one compression technique is applied to three-dimensional data.

15. A method for scanning a three dimensional object, the method comprising:
   a) developing a plurality of images of a three dimensional object to be scanned, said plurality of images being taken from a plurality of relative angles with respect to said object, said plurality of images depicting a plurality of surface portions of said object to be scanned; and
   b) computing a first representation of said plurality of surface portions of said object from said plurality of images, the representation comprising
      i) 3-D surface data,
      ii) multiple image data including color data,
      iii) multiple viewing angle data,
   c) developing at least local representation of a local surface region of said object, the local representation comprising surface attributes in addition to color, from a sub portion of the first representation utilizing the
      i) local 3-D surface data,
      ii) local multiple image data, and
      iii) local viewing angle data corresponding to the local surface region.

16. The method of claim 15 further comprising a plurality of local sub representations wherein the step of developing local representations further comprises independently processing a sub portion of the first representation.

17. The method 16 wherein said developing comprises removing redundant multiple image data from the first representation and selecting non-redundant multiple image data to be included in the sub representation.

18. The method of claim 15 wherein said developing further comprises compressing image data.

19. The method of claim 15 wherein the surface attributes includes specularity.

20. The method of claim 15 wherein at least one representation includes at least one viewing angle parameter.

21. The method of claim 15 wherein the representation includes at least one parameter for representing the change in surface appearance that corresponds to a change in lighting conditions.

22. The method of claim 15 wherein the surface attributes includes absorption.

23. A computer-readable medium having stored thereon a data structure representing an object, the data structure comprising:
   a) a plurality of sub representations from multiple images, each sub-representation to correspond to a local surface region of the object and further comprising;
      i) a first data for field for containing 3d surface data, ii) a second data for field for containing compressed multiple image data, the compressed image data having been compressed by a combination of compression technique, iii) a third data field for containing viewing angle data, iv) wherein the first, second and third data fields of the sub-representation are combinable to form a view dependent representation of the object.

24. A computer-readable medium according to claim 23 wherein at least a portion of the image data to be contained in each sub-representation is to be independently compressable with respect to portions of image data to be stored in the other sub-representations.

25. A computer-readable medium according to claim 23 wherein at least one representation includes at least one viewing angle parameter.

26. A computer-readable medium according to claim 23 wherein at least one subrepresentation is to includes at least one parameter for representing the change in surface appearance that corresponds to a change in lighting conditions.

27. A computer-readable medium according to claim 23 wherein each of said plurality of sub-representation is to be comprised of:
   a) 3d surface data for a plurality of local 3d surface points, the plurality of local surface points being part of an array of regularly spaced 3d surface points representing the surface of the object, and
   b) a plurality of viewing angle sets comprising multiple relative viewing angles, each relative viewing angle set corresponding to a local 3d surface point in the array.

28. A computer-readable medium having stored thereon a digital representation of a real object developed at least in part from color images of a plurality of surface portions of the real object, the representation comprising:
   a) a first component containing 3d surface data,
   b) a second component containing image data, the image data being comprised of selected non redundant multiple image data, the second component linked to the first component, the multiple image data describing the view dependent change in image a plurality of surface points
   c) a third component containing viewing angle data, the third component being linked to the both the second component and to the first component,
   wherein the components are integrated to form a representation describing the 3d surface of the plurality of surface portions of the object and the view dependent image of a plurality of surface points of the object, the image of the plurality of points changing from point to point and viewing angle to viewing angle.

29. The computer-readable medium according to claim 28 wherein the image data of the second component is further comprised of color data.

30. The computer-readable medium according to claim 28 wherein the image data is compressed by a plurality of compression techniques.

31. The computer-readable medium according to claim 28 further comprising a fourth component comprising surface non view dependent color data, the color values remaining constant from point to point and viewing angle to viewing angle of the local surface region
   i) wherein the components are integrated to form a representation describing,
   ii) the 3d surface of the plurality of surface portions the object,
   iii) the view dependent image of at least a portion of the surface of the object and of a plurality of surface points of the object the image of the plurality of points changing from point to point and viewing angle to viewing angle, and
   iv) the non view dependent color image of the plurality of surface portions of the object.

32. The computer-readable medium according to claim 23 wherein the digital representation is further comprised of a plurality of sub representations, each sub representation corresponding to a local surface region, each of the plurality sub representations comprising a plurality of sub components, the plurality sub components being combinable to describe the 3d surface of the local surface region and the view dependent image of a plurality of surface points of the local surface region, the image of the plurality of points changing from point to point and viewing angle to viewing angle.

33. A computer-readable medium having stored thereon a digital representation of at least a portion of a real object developed at least in part from color images of the object the representation comprising: 3-D surface data and image information linked to the 3d surface data, at least a portion of the image information comprising color information and at least a portion of the image information comprising selected non-redundant image data describing the change in image for each of at least a portion of the plurality of points, the image changing from viewing angle to viewing angle over a plurality of angles.

34. The computer-readable medium according to claim 33 wherein at least one compression technique has been independently applied to at least a portion of the image data corresponding to at least one local surface region.

35. The computer-readable medium according to claim 33 wherein at least a portion of the image data corresponding at least one local surface region has been compressed by a combination of compression techniques.

36. The computer-readable medium according to claim 33 wherein at least a portion of the color data does not change from viewing angle to viewing angle.

37. The computer-readable medium according to claim 33 wherein at least a portion of the color data not compressed.

38. A computer-readable medium having stored thereon a digital representation of at least a portion of a real object developed at least in part from images of the object, the representation comprised of: a plurality of sub-representations each sub representation corresponding to a local surface, each sub representation comprised of: 3-D surface data and image information linked to the 3d surface data developed at least in part from images of a real object, at least a portion the image information being stored in a compressed format, at least a portion the image information being color information.

39. The computer-readable medium according to claim 38 wherein at least one compression techniques has been independently applied to the image data corresponding each of at least a portion of the local surface regions.

40. The computer-readable medium according to claim 38 wherein each of at least a plurality of the sub representations each describe the change in image of a plurality surface points of the local surface region, the image changing viewing angle to viewing angle over a plurality of viewing angles.

41. The computer-readable medium according to claim 38 wherein at least a portion of the compressed multiple image information is comprised of selected non redundant image information, and at least a portion of the image information being comprised of color information.

42. The computer-readable medium according to claim 38 wherein at least a portion of the compressed multiple image has been compressed by a combination of compression techniques.

43. The computer-readable medium according to claim 38 wherein each of at least a plurality of the sub representations describe the change in image of a plurality surface points of the local surface region, the image changing from and from viewing angle to viewing angle over a plurality of viewing angles.

44. The computer-readable medium of claim 38 wherein the image information comprises:
  a) non view dependent color image information, and
  b) multiple image information describing at least the change in image corresponding to a change in viewing angle for a plurality of points of the surface of the object.

45. A computer-readable medium having stored thereon a digital representation of at least a portion of a real object developed at least in part from color images of the object, the representation comprising: 3-D surface data and image information linked to the 3d surface data at least a portion of the image information being stored in a compressed format the representation further comprising;
  a) non view dependent color image information, and
  b) multiple image information describing at least the change in image corresponding to a change in viewing angle for a plurality of points of the surface of the object.

46. A computer-readable medium having stored thereon a digital representation of at least a portion of a real object developed at least in part from color images of the object, the representation comprising: 3-D surface data and color image information linked to the 3d surface data,
  a) the representation further comprising data describing surface attributes in addition to color, the surface attributes being stored in connection with the 3d surface data, the surface attributes including at least absorption.

47. A computer-readable medium having stored thereon a digital representation of at least a portion of an object, the representation comprising: 3-D surface data and image information linked to the 3d surface data, at least a portion of the image information comprising color image information and at least a portion of the image information being comprised of multiple image information describing the specular appearance of a plurality of surface points of the object, the multiple image information being stored in a compressed format.

48. The computer-readable medium according to claim 47 wherein the multiple image information describing a local surface region of the object has been compressed independently of the image data corresponding to other regions of the object.

49. A computer-readable medium having stored thereon a digital representation of at least a portion of an object, the representation comprising: 3-D surface data and image information linked to the 3d surface data at least a portion of the image information comprising color image information and at least a portion of the image information being comprised of multiple image information describing the absorption of light of a plurality of surface points of the object, the multiple image information being stored in a compressed format.

50. The computer-readable medium according to claim 47 wherein the multiple image information describing a local surface region of the object has been compressed independently of the image data corresponding to other regions of the object.

51. A computer-readable medium having stored thereon a digital representation of at least a portion of an object, the representation comprising: 3-D surface data and image information linked to the 3d surface data at least a portion of the image information comprising color image information and at least a portion of the image information being comprised of multiple image information describing the emissivity of a plurality of surface points of the object, the multiple image information being stored in a compressed format.

52. The computer-readable medium according to claim 51 wherein the multiple image information describing a local surface region of the object has been compressed independently of the image data corresponding to other regions of the object.

53. A method for scanning a three dimensional object comprising:
  a) developing a plurality of images and corresponding viewing angle data describing a three dimensional object to be scanned, said plurality of images being taken from a plurality of relative angles with respect to said object, said plurality of images depicting a plurality of points on the surface of at least a portion of the object to be scanned; and
  b) computing from said plurality of images and corresponding viewing angle data, a digital representation describing at least a portion of the object, the computing further comprising:
    i) deriving 3d surface data,
    ii) processing multiple image information to develop approximate non view dependent color image data describing the plurality of points,
    iii) forming, from the multiple image information, image data describing the approximate change in image corresponding to the change in viewing angle for each of one or more of the plurality of points, for each point the change in image being relative to the approximate non view dependent color data describing the point, the forming comprising compressing the multiple image information,
    iv) associating the viewing angle data, surface data, multiple image data and non view dependent color data to describe both the 3d shape and surface image of the at least a portion of the object from a plurality of viewing angles.

54. The method of claim 53 further comprising developing the non view dependent color image data of one or more points from a weighted average of the color of the point in different images, wherein the weighting factor varies with the viewing angle of the image.

55. The method of claim 53 wherein said step of compressing comprises selecting, from the multiple image information, non redundant image data, the non-redundant image data describing only the change in image of the one or more of the plurality of points corresponding to the change in viewing angle.

56. The method of claim 53 wherein said step of computing further comprises:
  a) developing a representation comprising;
    i) a first component containing 3-D surface data,
    ii) a second component containing an approximate non-view dependent color data describing the plurality of points, and iii) multiple image data describing the change in image corresponding to the change in viewing angle of at least a portion of the plurality of points on the surface of the object, the change in image being relative to the approximate non-view dependent color data describing the plurality of points, and the multiple image data comprised of compressed image data, b) linking the multiple viewing angle data, 3d surface data and image data for storage on a computer readable medium.

57. The method of claim 56 further comprising storing the digital representation on the computer readable medium of claim 38.

58. The method of claim 56 wherein said step of developing further comprises forming a representation comprised of sub representations, each sub representation corresponding to a local surface region of the object.

59. The method of claim 58 wherein each of the sub representations are comprised of a plurality of components that are combinable to describe both the 3d shape and the apparent surface image of the at least a portion of the object from a plurality of viewing angles.

60. A method of forming a digital representation of an real object from a plurality of multiple images depicting a plurality of surface portions acquired at multiple viewing angles, the method comprising:
   a) developing a plurality of images of a three dimensional object to be scanned, said plurality of images being taken from a plurality of relative angles with respect to said object said plurality of images depicting a plurality of points on the surface of at least a portion of the object to be scanned;
   b) computing from the at least the plurality of images a digital representations, the representation comprising 3-D surface data and image information linked to the 3d surface data describing the at least a portion of the object, at least a portion of the image information being color information and at least a portion of the image information being compressed image information, and
   c) said step of computing comprises transferring multiple images over a network and using processors that are distributed over a network.

61. The method of claim 60 wherein the network is the internet.

62. The method of claim 60 wherein further comprising;
   a) developing viewing angle information.
   b) developing multiple image information, the multiple image information representing the images of the plurality of points from multiple viewing angles,
   c) linking the multiple image information and viewing angle information to create a view dependent representation describing the color and change in image for at least a portion of the plurality of points, the image changing from point to point and from viewing angle to viewing angle.

63. The method of claim 60 further comprising storing the digital representation on the computer readable medium of claim 38.

64. The method of claim 60 wherein the change in image includes a change in intensity.

65. The method of claim 60 wherein the change in image includes a change in color.

66. The method of claim 60 wherein developing includes automatically controlling at least a portion of the acquisition process.

67. The method of claim 60 further comprising providing a communications interface and using the communications interface for computing the representation.

68. The method of claim 60 wherein the acquisition process is monitored over the network.

69. The method of claim 60 wherein the step of computing is monitored over the network.

70. The method of claim 60 wherein the multiple image data is comprised of selected non redundant multiple image data.

71. The method of claim 60 wherein image data is comprised image data having been compressed by a plurality of compression techniques.

72. A method of forming a digital representation of an real object from a plurality of multiple images depicting a plurality of surface portions acquired at multiple viewing angles, the method comprising:
   a) developing a plurality of color images of a three dimensional object to be scanned, said plurality of images being taken from a plurality of relative angles with respect to said object, said plurality of images depicting a plurality of points of the surface of at least a portion of the object;
   b) creating a representation comprised of a plurality of sub representations each sub representation describing a local surface region of the object, each sub representation corresponding to a local surface region of the object, each sub representation comprising 3d surface data and image information linked to the 3d surface data, at least a portion of the image information comprising compressed image information, at least a portion of the image information comprising color information, wherein said step of creating includes compressing at least a portion of the image information using a combination of compression techniques.

73. The method of claim 72 wherein at least one of the combination of compression techniques is independently applied the image data corresponding a local surface region of the object.

74. The method of claim 72 wherein the step of creating includes developing viewing angle information and linking the multiple image information, viewing angle information and 3d surface data to describe the change in image of a plurality of points of the local surface corresponding to each of at least a portion of the sub representations.

75. The method of claim 72 wherein the step of creating includes deriving surface attributes in addition to color and storing the surface attributes in connection with the 3d surface data.

76. The method of claim 74 wherein the data describing in image is comprised of data describing the change in intensity for a plurality of surface points.

77. The method of claim 74 wherein the data describing in image is comprised of data describing the change in color for a plurality of surface points.

78. The method of claim 74 wherein at least portion of the creating is performed using a network.

79. The method of claim 74 wherein the at least portion of the developing is automatically performed.

80. The method of claim 72 wherein at least portion of the developing is performed using a network.

81. The method of claim 80 wherein the network is the internet.

82. A method of forming a digital representation of an real object from a plurality of multiple images depicting a plurality of surface portions acquired at multiple viewing angles, the method comprising:

a) developing a plurality of images of a three dimensional object to be scanned, said plurality of images being taken from a plurality of relative angles with respect to said object said plurality of images depicting a plurality of points on the surface of the object to be scanned;

b) creating a digital representation from at least the plurality of images, the representation comprised of 3-D surface data and image information linked to the 3d surface data, at least a portion of the representation comprising compressed image information, wherein said step of creating includes compressing the image information using a combination of compression techniques.

83. The method of claim 82 wherein the step of creating includes developing viewing angle information and linking the multiple image information and viewing angle information to create a view dependent representation describing the color and specular appearance for at least a portion of the plurality of points.

84. The method of claim 82 wherein the step of creating includes deriving surface attributes in addition to color and storing the surface attributes in connection with the 3d surface data.

85. The method of claim 82 wherein said step of creating includes processing the images using processors that are distributed over a network.

86. The method of claim 82 wherein the network is the internet.

87. A Computer readable medium having stored thereon instructions for accessing and processing data to be included within a digital representation of a real object, a) wherein the digital representation of a real object is to comprise;
  i) a first component comprising compressed color image data, the color image data having been developed at least in part from portions of color images of a plurality of surface portions of a real object,
  ii) a second component comprising data describing at least the change in image corresponding to a change in viewing angle for a plurality of points of the surface of the object,
  iii) a third component comprising 3d surface data having been developed at from one or more portions of images of the object,
  iv) wherein the representation to be accessed will be further comprised of 3d surface data linked with the image data and wherein the instructions are operative to form a view dependent description of the view dependent image and of a plurality of surface points on at least portions of the object, b) wherein the instructions are further operative to decompress at least a portion of the image data to be contained within the digital representation.

88. The computer readable medium according to claim 87 wherein the second component is for storing information to be developed from images of the object and is to be comprised of at least one of data describing specularity, compressed multiple image information, selected non-redundant image information and multiple image information compressed by a plurality of compression techniques.

89. The computer readable medium according to claim 87 wherein the representation is to be further comprised of a plurality of sub-representations, each sub-representation corresponding to a local surface, each sub representation to have sub-portions of each of the first, second and third components, wherein the sub-portions are to be combinable, to describe the change in image corresponding to a change in viewing angle for a plurality of points of the local surface wherein at least a portion of the image data corresponding to each subrepresentation is to be independently decompressable with respect to the image data corresponding to the other subrepresentations.

90. A method for accessing and decompressing data included within a digital representation of a real object, the method comprising the steps of:

a) accessing a digital representation of a real object that comprises;
  i) a first component comprising compressed color image data, the color image data having been developed at least in part from one or more portions of images of the real object,
  ii) a second component comprising information describing at least the change in image corresponding to a change in viewing angle for a plurality of points of the surface of the object,
  iii) a third component comprising 3d surface data having been developed at least in part from at least portion of the images taken of a real object,
  iv) wherein the first, second and third components are combinable for forming a view-dependent representation comprised of 3d surface data and linked image information describing the view dependent image of a plurality of surface points of portions the object, b) decompressing at least a portion of the image data to be stored within the structure.

91. The method according to claim 90 further comprising the steps of transmitting a request for at least a portion of the representation over the a network and receiving at least a portion of the representation.

92. The method according to claim 90 wherein the network is the internet.

93. The method according to claim 90 further wherein the second component includes at least one of data describing specularity, compressed multiple image information, selected non-redundant image information and multiple image information compressed by a plurality of compression techniques.

94. The method according to claim 90 wherein the representation is further comprised of a plurality of sub-representations corresponding to a local surface, each sub representation having a first, second and third data component describe the change in image corresponding to a change in viewing angle for a plurality of points of the local surface wherein at least a portion of the image data corresponding to each subrepresentation is independently expandable with respect to the image data corresponding to other local surfaces.

95. A method for accessing and processing image based data included within a digital representation of a real object, the method comprising the steps of:

a) accessing a digital representation of a real object, the representation comprising;
  i) a first component comprising compressed color image data developed in part from at least portions of images of the real object,
  ii) a second component comprising 3d surface data developed at least in part from the images of the object,
  iii) wherein the 3d shape and color image data of first and second components are linked to be combinable for forming a representation describing of the object, b) decompressing at least a portion of the image data stored within the structure.

96. A method according to claim 95 further comprising transmitting a request over the internet for at least a portion of a digital representation of the real object.

97. A method according to claim 95 wherein the network is the internet.

98. A computer-readable medium having stored thereon a data structure for storing a digital representation of a real object, the data structure to comprise:
- a) a first component for storing compressed color image data, the data to have been developed in part from at least portions of images of the real object,
- b) a second component for storing 3d surface data, the data to have been developed at least in part from the images of the object,
- c) a third component for storing data to describe at least the change in image corresponding to a change in viewing angle for a plurality of points of the surface of the object the data further to be comprised of at least one of data describing specularity, compressed multiple image information, selected non-redundant image information and multiple image information compressed by a plurality of compression techniques,
- d) wherein color image data and the 3d surface data of first and second components are to be linked.

99. The method according to claim 95 wherein the representation is further comprised of a plurality of sub-representations corresponding to a local surface, each sub representation having a first, second and third data component to describe the change in image corresponding to a change in viewing angle for a plurality of points of the local surface and wherein at least a portion of the image data corresponding to each subrepresentation is independently expandable with respect to the image data corresponding to other local surface.

100. A method for accessing and expanding image based data included within a digital representation of a real object, the method comprising the steps of:
- transmitting a request over the internet for at least a portion of a digital representation of the real object, the representation is organized in a data structure that comprises;
  - i) a first component for storing compressed color image data developed from color images of the object,
  - ii) a second component for storing 3d surface data developed at least in part from images of the object,
  - iii) wherein the first and second components are linked so as to be combinable to represent the real object,
- b) decompressing at least a portion of the image data to be stored within the structure.

101. The method according to claim 100 further comprising the steps of transmitting a request for at least a portion of the representation over a network and receiving at least a portion of the representation from the network.

102. The method according to claim 101 wherein the the data structure includes at least one more component for storing information developed from images of the object comprised of at least one data describing specularity, compressed multiple image information, selected non-redundant image information and multiple image information compressed by a plurality of compression techniques.

103. The method according to claim 102 wherein the representation is further comprised of: a plurality of sub-representations corresponding to a local surface, each sub representation having a first, second and third data component, that are combinable for describing the change in image corresponding to a change in viewing angle for a plurality of points of the local surface wherein at least a portion of the image data to be stored in each subrepresentation is independently expandable with respect to the image data corresponding to other local surfaces.

104. A computer readable medium having stored thereon a data structure for forming a digital representation of an object, the data structure comprising:
- a) a plurality of sub-representations, each sub-representation to correspond to a local surface region of the object and to describe the 3d shape and color image for a plurality of points of the surface of the local surface, and further comprising;
  - i) a first component for storing compressed color image information,
  - ii) a second component for storing 3d surface data,
  - iii) a third component for storing information describing at least the change in surface image corresponding to a change in viewing angle for a plurality of points of the surface of the object, wherein at least a portion of the image data to be contained in each sub-representation is to be independently decompressable with respect to portions of image data to be stored in the other sub-representations.

105. A computer-readable medium according to claim 104 wherein the digital representation includes information describing at least the change in image corresponding to a change in viewing angle for a plurality of points of the surface of the object, in which one or more of the data components comprises at least one of compressed multiple image information, selected non-redundant multiple image information and multiple image information compressed by a plurality of compression techniques.

106. A computer-readable medium according to claim 104 wherein the representation is further comprised of a component for storing data describing a change in image corresponding to a change in lighting conditions.

107. A computer-readable medium according to claim 104 further comprising instructions to access and decompress at least a portion of the multiple image information.

108. A computer-readable medium according to claim 104 further comprising instructions to compress at least a portion of the multiple image information.

109. A computer readable medium having stored thereon a data structure for forming a digital representation of an object, the data structure comprising:
- a) a first component for storing color image information,
- b) a second component for storing 3d surface data,
- c) a third component for storing compressed multi image information describing at least the change in image corresponding to a change in viewing angle for a plurality of points of the surface of the object,
- d) wherein the image information is to be linked to the 3d surface data and wherein the first, second and third components are combinable for forming a view-dependent representation describing at least a view dependent image and of the plurality of surface points.

110. The computer-readable medium according to claim 109 wherein the representation is comprised of a plurality of sub-representations, each of the sub-representations corresponding to a local surface region and having a first, second and third component.

111. The computer-readable medium according to claim 110 wherein one or more of said sub-representations have:
- a) a data field for containing a plurality of local 3d surface points, the plurality of local surface points being part of an may of spatially regularized 3d surface points representing the surface of the object, and b) a data field for containing a plurality of viewing angle sets comprising multiple relative viewing angles, each relative viewing angle set corresponding to a describing a plurality of viewing angles with respect to a local 3d surface point in the array.

112. A computer readable medium according to claim 110 wherein at least a portion of the image data for each plurality of sub-representations is to be independently compressible with respect to the image data representing other surface regions of the object.

113. A computer-readable medium according to claim 109 wherein the representation is further comprised of a component for storing data describing a change in image corresponding to a change in lighting conditions.

114. A computer-readable medium according to claim 109 further comprising instructions to access and decompress at least a portion of the multiple image information.

115. A computer-readable medium according to claim 109 further comprising instructions to compress at least a portion of the multiple image information.

116. The method according to claim 100 wherein the representation is to be further comprised of: a plurality of sub-representations, each sub-representation corresponding to a local surface and for storing at least in part local color image data to have been selected using viewing angle data corresponding to each portion of the color image.

117. The method of claim 116 wherein the color image data to be stored is to have been selected from a weighted average of the color of at least a portion of the images, wherein the weighting factor varies with the viewing angle data.

118. The method according to claim 100 wherein the data structure includes at least one more component is for storing information describing at least one of the group consisting of absorption, emissivity and specularity.

119. The method of claim 100 wherein at least a portion the three-dimensional data is to be stored in a compressed format.

120. A computer readable medium according to claim 104 further comprising transmitting a request for a sub-representation over a network and receiving the sub-representation wherein the data structure contains data developed at least in part from images.

121. A computer-readable medium according to claim 104 wherein for at least a portion of the data to be stored in a plurality of the components the compression format is different from component to component.

122. A computer-readable medium according to claim 104 wherein at least a portion of data to be stored is compressed 3d data.

123. A computer-readable medium according to claim 122 wherein the data structure is comprised of a fourth component for describing emissivity.

124. A computer-readable medium according to claim 104 wherein the data to be stored in the third component is to be for describing specularity.

125. A computer-readable medium according to claim 104 wherein the data to be stored in the third component is for describing at least one of emissivity and absorption.

126. A computer-readable medium according to claim 104 wherein the data structure is comprised of a fourth component for describing emissivity.

127. A computer-readable medium according to claim 104 wherein the data structure is comprised of a fourth component for describing absorption.

128. A computer-readable medium according to claim 104 wherein the data structure is comprised of a component for storing compressed data describing at least one of specularity, absorption and emissivity.

129. A computer-readable medium according to claim 122 wherein at least a portion of data is to be compressed by at least a second compression technique after having been compressed by a first compression technique.

130. The computer-readable medium according to claim 104 wherein at least a portion of the 3d data to be stored is to be comprised of a plurality of 3d surface points, the surface points being part of an array of spatially regularized 3d surface points.

131. The computer-readable medium according to claim 109 wherein at least a portion of the 3d data to be stored is to be comprised of a plurality of 3d surface points, the surface points being part of an array of spatially regularized 3d surface points.

132. The computer-readable medium according to claim 131 wherein the data structure is for storing for storing a plurality of viewing angle sets comprising multiple relative viewing angles, each viewing angle set describing a plurality of viewing angles with respect to a local 3d surface point in the array.

133. A computer-readable medium according to claim 104 wherein the data structure is for storing data describing at least one of emissivity, absorption and specularity.

134. A computer-readable medium according to claim 133 wherein at least a portion of data to be stored is compressed 3d data.

135. A computer-readable medium according to claim 134 wherein for at least a portion of the data to be stored in a plurality of the components the compression format is to differ from component to component.

136. A computer-readable medium according to claim 124 wherein for at least a portion of the data to be stored in a plurality of the components the compression format is to differ from component to component.

137. A computer-readable medium according to claim 125 wherein at least a portion of data to be stored is compressed 3d data.

138. A computer-readable medium according to claim 124 wherein at least a portion of data is to be compressed by at least a second compression technique after having been compressed by a first compression technique.

139. A computer-readable medium according to claim 124 wherein at least a portion of data to be stored is compressed 3d data.

140. The computer-readable medium of claim 124 further comprising instructions to perform one of compressing and decompressing at least a portion of the data to be stored.

141. The computer-readable medium according to claim 139 wherein at least a portion of the 3d data to be stored is to be comprised of a plurality of 3d surface points, the surface points being part of an array of spatially regularized 3d surface points.

142. The computer-readable medium according to claim 104 wherein at least a portion of the 3d data to be stored is to be comprised of a plurality of 3d surface points, the surface points being part of an array of spatially regularized 3d surface points.

143. The computer-readable medium according to claim 109 wherein at least a portion of the 3d data to be stored is to be comprised of a plurality of 3d surface points, the surface points being part of an array of spatially regularized 3d surface points.

144. The computer-readable medium according to claim 142 wherein a component of the data structure is for storing a plurality of viewing angle sets that comprise multiple relative viewing angles, each viewing angle set describing a plurality of viewing angles with respect to a local 3d surface point in the array.

145. A method of requesting and receiving a digital representation of an object, the method comprising;
- a) transmitting a request for at least a portion of a digital representation over a network, wherein the representation is stored in a data structure that comprises;
  - i) a plurality of sub-representations, each sub-representation corresponding to a local surface region and describing the 3d shape and color image for a plurality of points of the local surface, and further comprising;
    - (1) a first component storing compressed color image information,
    - (2) a second component storing 3d surface data,
    - (3) a third component storing information describing at least the change in image corresponding to a change in viewing angle for the plurality of points of the surface of the object, wherein the image data of the first, second and third components of each sub-representation are independently decompressable with respect to portions of image data to be stored in other sub-representations.
- b) receiving the representation from the network.

146. The method of requesting and receiving a digital representation of an object according to claim 145 wherein the data structure is comprised of a fourth component for containing data describing at least one of emissivity and absorption.

147. The method of requesting and receiving a digital representation of an object according to claim 145 further comprising the step of decompressing the data received from the network as part of the representation.

148. The method of requesting and receiving a digital representation of an object according to claim 145 wherein the network is the internet.

149. The method of requesting and receiving a digital representation of an object according to claim 148 wherein the data to be stored in the third component is to be for describing specularity.

150. The method of requesting and receiving a digital representation of an object according to claim 148 wherein the data to be stored in the third component is for describing at least one of emissivity and absorption.

151. The method of requesting and receiving a digital representation of an object according to claim 148 wherein at least a portion of the data is for describing at least one of emissivity, absorption and specularity.

152. A computer-readable medium according to claim 145 wherein for at least a portion of the data to be stored in at least one of the first, second and third the components the compression format is to differ from component to component.

153. The method of requesting and receiving a digital representation of an object according to claim 148 wherein at least a portion of data to be stored is compressed 3d data.

154. The method of requesting and receiving a digital representation of an object according to claim 153 wherein at least a portion of data is to be compressed by at least a second compression technique after having been compressed by a first compression technique.

* * * * *